United States Patent
Yin et al.

(10) Patent No.: US 9,853,779 B2
(45) Date of Patent: Dec. 26, 2017

(54) SYSTEMS AND METHODS FOR CARRIER AGGREGATION

(71) Applicant: Sharp Laboratories of America, Inc., Camas, WA (US)

(72) Inventors: Zhanping Yin, Vancouver, WA (US); Shohei Yamada, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 145 days.

(21) Appl. No.: 14/152,759

(22) Filed: Jan. 10, 2014

(65) Prior Publication Data

US 2015/0200752 A1   Jul. 16, 2015

(51) Int. Cl.

| | | |
|---|---|---|
| *H04B 7/212* | (2006.01) | |
| *H04L 1/18* | (2006.01) | |
| *H04L 5/14* | (2006.01) | |
| *H04W 72/04* | (2009.01) | |
| *H04L 5/00* | (2006.01) | |
| *H04L 1/16* | (2006.01) | |

(52) U.S. Cl.
CPC .......... *H04L 1/1887* (2013.01); *H04L 1/1671* (2013.01); *H04L 1/1861* (2013.01); *H04L 5/001* (2013.01); *H04L 5/0055* (2013.01); *H04L 5/14* (2013.01); *H04W 72/0446* (2013.01)

(58) Field of Classification Search
CPC .................. H04L 1/18; H04L 1/1812–1/1819
USPC ........................... 370/280, 278, 312; 455/436
See application file for complete search history.

(56) References Cited

U.S. PATENT DOCUMENTS

| | | | |
|---|---|---|---|
| 8,472,471 B2 | 6/2013 | Yang et al. | |
| 2012/0207109 A1* | 8/2012 | Pajukoski et al. | 370/329 |
| 2013/0176918 A1* | 7/2013 | Fu et al. | 370/280 |
| 2013/0229953 A1 | 9/2013 | Nam et al. | |
| 2014/0105141 A1* | 4/2014 | Noh | H04W 52/04 370/329 |
| 2014/0112280 A1* | 4/2014 | Lee et al. | 370/329 |
| 2014/0119263 A1* | 5/2014 | Shauh et al. | 370/312 |

(Continued)

FOREIGN PATENT DOCUMENTS

WO   2012149456 A1   11/2012

OTHER PUBLICATIONS

Sharp, "Comparison of HARQ-ACK timing approaches for eIMTA cell," R1-133230, Aug. 19, 2013.

(Continued)

*Primary Examiner* — Andrew Chriss
*Assistant Examiner* — Kenan Cehic
(74) *Attorney, Agent, or Firm* — Austin Rapp

(57) ABSTRACT

A UE for performing carrier aggregation is described. The UE determines a duplex method of each serving cell for carrier aggregation. A primary cell is a FDD cell. When transmitting PDSCH HARQ-ACK information on a PUSCH or using a PUCCH format 3 in a later subframe, the UE generates two NACKs for a PDSCH transmission in an earlier subframe for a serving cell when a configured downlink transmission mode supports up to two transport blocks, the serving cell is a TDD cell and an earlier subframe is an uplink subframe for the serving cell. The UE further generates a single NACK for a PDSCH transmission in an earlier subframe for a serving cell when a configured downlink transmission mode supports a single transport block, the serving cell is a TDD cell and an earlier subframe is an uplink subframe for the serving cell.

12 Claims, 13 Drawing Sheets

(56) References Cited

U.S. PATENT DOCUMENTS

| | | | |
|---|---|---|---|
| 2014/0153449 A1* | 6/2014 | Seo et al. | 370/280 |
| 2014/0192688 A1* | 7/2014 | Yang et al. | 370/280 |
| 2014/0211671 A1* | 7/2014 | Choi et al. | 370/280 |
| 2015/0131494 A1* | 5/2015 | He et al. | 370/280 |

OTHER PUBLICATIONS

LG Electronics, "Consideration on HARQ-ACK and DCI for TDD-FDD CA," R1-135464, Nov. 11, 2013.

International Search Report issued for International Patent Application No. PCT/JP2015/000112 on Mar. 17, 2015.

3GPP TS 36.213 V11.4.0, Evolved Universal Terrestrial Radio Access (E-UTRA), Physical layer procedures, (Release 11), Sep. 2013.

3GPP TS 36.212 V11.3.0, Evolved Universal Terrestrial Radio Access (E-UTRA), Multiplexing and channel coding, (Release 11), Jun. 2013.

MCC Support, "Draft Report of 3GPP TSG RAN WG1 #75 v0.1.0," 3GPP TSG-RAN WG1 Meeting #76, R1-140001, Prague, CZ Rep., Feb. 10-14, 2014.

Catt, "UCI transmission for FDD-TDD carrier aggregation," 3GPP TSG RAN WG1 Meeting #75, San Francisco, USA, 1-135074 Nov. 15, 2013.

* cited by examiner

SYSTEMS AND METHODS FOR CARRIER AGGREGATION

TECHNICAL FIELD

The present disclosure relates generally to communication systems. More specifically, the present disclosure relates to systems and methods for carrier aggregation.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
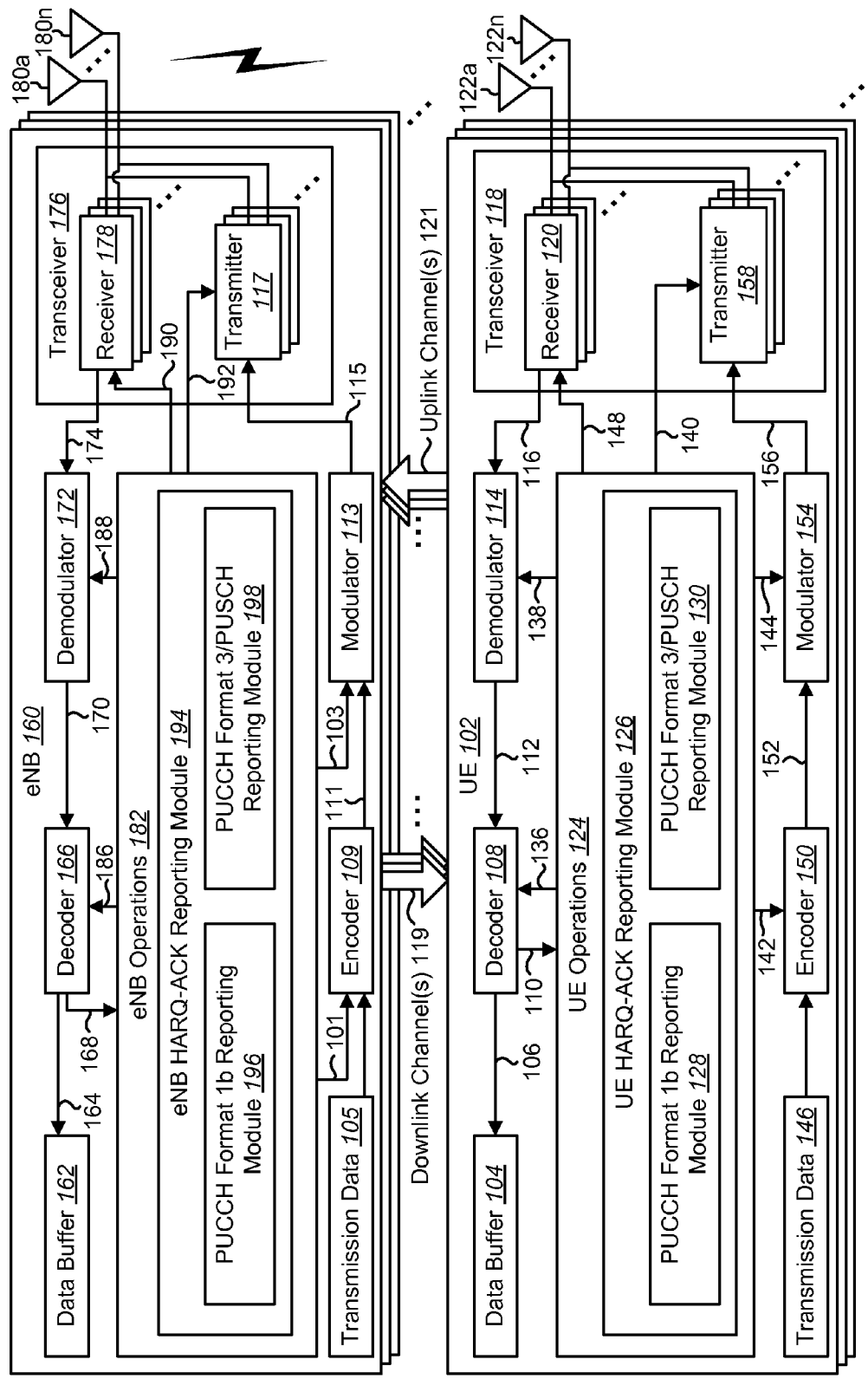
FIG. 1 is a block diagram illustrating one configuration of one or more evolved Node Bs (eNBs) and one or more user equipments (UEs) in which systems and methods for carrier aggregation may be implemented.

A user equipment (UE) for performing carrier aggregation is described. The UE includes a processor and memory in electronic communication with the processor. Instructions stored in the memory are executable by the processor to determine a duplex method of each serving cell for carrier aggregation. A primary cell is a FDD cell. When transmitting physical downlink shared channel (PDSCH) hybrid automatic repeat request acknowledgement/negative acknowledgement (HARQ-ACK) information on a physical uplink shared channel (PUSCH) or using a physical uplink control channel (PUCCH) format 3 in a later subframe, the instructions are also executable to generate two negative acknowledgments (NACKs) for a PDSCH transmission in an earlier subframe for a serving cell when a configured downlink transmission mode supports up to two transport blocks, the serving cell is a TDD cell and an earlier subframe is an uplink subframe for the serving cell. The instructions are further executable to generate a single NACK for a PDSCH transmission in an earlier subframe for a serving cell when a configured downlink transmission mode supports a single transport block, the serving cell is a TDD cell and an earlier subframe is an uplink subframe for the serving cell.

When transmitting PDSCH HARQ-ACK information using a PUCCH format 1b with channel selection in the later subframe the instructions are executable to set at least one discontinuous transmission (DTX) bit to a HARQ-ACK bit for a PDSCH transmission in an earlier subframe for a serving cell when the serving cell is a TDD cell and the earlier subframe is an uplink subframe for the serving cell.

Determining whether the earlier subframe is an uplink subframe for the TDD serving cell may be based on an uplink/downlink (UL/DL) configuration defined by a radio resource control common secondary cell (RRCCommonSCell) message. Determining whether the earlier subframe is an uplink subframe for the TDD serving cell may be further based on an explicit reconfiguration downlink control information (DCI) signaling of the TDD serving cell.

The one or two NACKs may be multiplexed with HARQ-ACK bits of other serving cells. Generating one or two NACKs may depend on a number of codewords configured for a subframe of the TDD serving cell.

The UE may also monitor the earlier subframe of the TDD serving cell for the PDSCH transmission. The UE may further determine that the earlier subframe is an uplink subframe for the TDD serving cell. No HARQ-ACK bit may be generated for the TDD serving cell in the later subframe.

An evolved Node B (eNB) for performing carrier aggregation is also described. The eNB includes a processor and memory in electronic communication with the processor. Instructions stored in the memory are executable by the processor to determine a duplex method of each serving cell for carrier aggregation. A primary cell is a FDD cell. When receiving PDSCH HARQ-ACK information on a PUSCH or using a PUCCH format 3 in a later subframe, the instructions are also executable to receive two NACKs for a PDSCH transmission in an earlier subframe for a serving cell when a configured downlink transmission mode supports up to two transport blocks, the serving cell is a TDD cell and an earlier subframe is an uplink subframe for the serving cell. The instructions are further executable to receive a single NACK for a PDSCH transmission in an earlier subframe for a serving cell when a configured downlink transmission mode supports a single transport block, the serving cell is a TDD cell and an earlier subframe is an uplink subframe for the serving cell.

When receiving PDSCH HARQ-ACK information using a PUCCH format 1b with channel selection in the later subframe the instructions are executable to receive at least one DTX bit for a HARQ-ACK bit for a PDSCH transmission in an earlier subframe for a serving cell when the serving cell is a TDD cell and the earlier subframe is an uplink subframe for the serving cell.

Determining whether the earlier subframe is an uplink subframe for the TDD serving cell may be based on an UL/DL configuration defined by a RRCCommonSCell message. Determining whether the earlier subframe is an uplink subframe for the TDD serving cell may be further based on an explicit reconfiguration DCI signaling of the TDD serving cell.

The one or two NACKs may be multiplexed with HARQ-ACK bits of other serving cells. Receiving one or two NACKs may depend on a number of codewords configured for a subframe of the TDD serving cell.

A method for performing carrier aggregation by a UE is also described. The method includes determining a duplex method of each serving cell for carrier aggregation. A primary cell is a FDD cell. When transmitting PDSCH HARQ-ACK information on a PUSCH or using a PUCCH format 3 in a later subframe the method also includes generating two NACKs for a PDSCH transmission in an earlier subframe for a serving cell when a configured downlink transmission mode supports up to two transport blocks, the serving cell is a TDD cell and an earlier subframe is an uplink subframe for the serving cell. The method further includes generating a single NACK for a PDSCH transmission in an earlier subframe for a serving cell when a configured downlink transmission mode supports a single transport block, the serving cell is a TDD cell and an earlier subframe is an uplink subframe for the serving cell.

A method for performing carrier aggregation by an evolved Node B (eNB) is also described. The method includes determining a duplex method of each serving cell for carrier aggregation. A primary cell is a FDD cell. When receiving PDSCH HARQ-ACK information on a PUSCH or using a PUCCH format 3 in a later subframe, the method also includes receiving two NACKs for a PDSCH transmission in an earlier subframe for a serving cell when a configured downlink transmission mode supports up to two transport blocks, the serving cell is a TDD cell and an earlier subframe is an uplink subframe for the serving cell. The method further includes receiving a single NACK for a PDSCH transmission in an earlier subframe for a serving cell when a configured downlink transmission mode supports a single transport block, the serving cell is a TDD cell and an earlier subframe is an uplink subframe for the serving cell.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in an E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

When carrier aggregation (CA) is configured, the UE may have one radio resource control (RRC) connection with the network. One radio interface may provide carrier aggregation. During RRC connection establishment, re-establishment and handover, one serving cell may provide non-access stratum (NAS) mobility information (e.g., a tracking area identity (TAI)). During RRC connection re-establishment and handover, one serving cell may provide a security input. This cell may be referred to as the primary cell (PCell). In the downlink, the component carrier corresponding to the PCell may be the downlink primary component carrier (DL PCC), while in the uplink it may be the uplink primary component carrier (UL PCC).

Depending on UE capabilities, one or more SCells may be configured to form together with the PCell a set of serving cells. In the downlink, the component carrier corresponding to a SCell may be a downlink secondary component carrier (DL SCC), while in the uplink it may be an uplink secondary component carrier (UL SCC).

The configured set of serving cells for the UE, therefore, may consist of one PCell and one or more SCells. For each SCell, the usage of uplink resources by the UE (in addition to the downlink resources) may be configurable. The number of DL SCCs configured may be larger than or equal to the number of UL SCCs and no SCell may be configured for usage of uplink resources only.

From a UE viewpoint, each uplink resource may belong to one serving cell. The number of serving cells that may be configured depends on the aggregation capability of the UE. The PCell may only be changed using a handover procedure (e.g., with a security key change and a random access channel (RACH) procedure). The PCell may be used for transmission of the PUCCH. Unlike the SCells, the PCell may not be deactivated. Re-establishment may be triggered when the PCell experiences radio link failure (RLF), not when the SCells experience RLF. Furthermore, NAS information may be taken from the PCell.

The reconfiguration, addition and removal of SCells may be performed by an RRC. At intra-LTE handover, RRC may also add, remove or reconfigure SCells for usage with a target PCell. When adding a new SCell, dedicated RRC signaling may be used for sending all required system information of the SCell (e.g., while in connected mode, UEs need not acquire broadcasted system information directly from the SCells).

The systems and methods disclosed herein describe carrier aggregation. In some implementations, the systems and methods disclosed herein describe LTE enhanced carrier aggregation (eCA) with hybrid duplexing. In particular, the systems and methods describe downlink (DL) association sets and PDSCH hybrid automatic repeat request acknowledgement/negative acknowledgement (HARQ-ACK) transmission timings that may be used in time division duplexing (TDD) and frequency division duplexing (FDD) carrier aggregation (CA). In one case, a primary cell (PCell) may report uplink control information (UCI). In another case, a secondary cell (SCell) may be configured as a reporting cell for the UCI.

Carrier aggregation refers to the concurrent utilization of more than one carrier. In carrier aggregation, more than one cell may be aggregated to a UE. In one example, carrier aggregation may be used to increase the effective bandwidth available to a UE. The same TDD uplink-downlink (UL/DL) configuration has to be used for TDD CA in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

A FDD cell requires spectrum (e.g., radio communication frequencies or channels) in which contiguous subsets of the spectrum are entirely allocated to either UL or DL but not both. Accordingly, FDD may have carrier frequencies that are paired (e.g., paired DL and UL carrier frequencies). However, TDD does not require paired channels. Instead, TDD may allocate UL and DL resources on the same carrier frequency. Therefore, TDD may provide more flexibility on spectrum usage. With the increase in wireless network traffic, and as spectrum resources become very precious, new allocated spectrum tends to be fragmented and has smaller bandwidth, which is more suitable for TDD and/or small cell deployment. Furthermore, TDD may provide flexible channel usage through traffic adaptation with different TDD UL/DL configurations and dynamic UL/DL re-configuration.

The systems and methods described herein include carrier aggregation (CA) under the same scheduler control, with a macro cell and a small cell (e.g., femtocell, picocell, microcell, etc.) heterogeneous network scenario. For the LTE network deployment, most carriers choose FDD-LTE. However, TDD-LTE is becoming more and more important in many markets. A TDD implementation may provide flexibility for small cells with fast traffic adaptation.

With TDD CA and hybrid duplexing networks, the macro cells and pico/small cells may use different frequency bands. A frequency band is a small section of the spectrum, in which communication channels may be established. For example, in a typical CA case, the macro cell may use a lower frequency band and the pico/small cell may use a higher frequency band. For hybrid duplexing networks, a possible combination is to have FDD on a macro cell and TDD on a pico/small cell.

In carrier aggregation, the HARQ-ACK bits of all configured cells can be reported on the physical uplink control channel (PUCCH) of the PCell, or on a physical uplink shared channel (PUSCH). In 3GPP Release-10 and 11, CA for FDD cells and CA for TDD cell with the same or different UL/DL configurations are specified. Support for carrier aggregation between TDD and FDD cells (e.g., TDD-FDD CA) was introduced in 3GPP Release-12. TDD and FDD cells have very different HARQ-ACK reporting mechanisms. The systems and methods described herein provide procedures for HARQ-ACK multiplexing and reporting for TDD-FDD CA when a FDD cell is the PCell and at least one SCell is a TDD cell. Furthermore, multiplexing procedures for both PUCCH and PUSCH reporting are described herein.

In a known approach, if the PCell is a FDD cell, a TDD SCell may follow the FDD cell for the PDSCH HARQ-ACK timing. Currently, TDD CA HARQ-ACK multiplexing and FDD CA HARQ-ACK multiplexing are defined separately. In TDD-FDD CA, the HARQ-ACK of all cells may be reported on the PUCCH of the PCell. The HARQ-ACK bits can also be reported on the PUSCH.

In the case where the PCell is a FDD cell, a TDD SCell may follow the FDD timing for the PDSCH HARQ-ACK reporting. However, different from a FDD cell, a TDD serving cell has UL subframe allocations. Therefore, a UE should determine how to handle this case. Furthermore, a TDD SCell may be an eIMTA cell (e.g., a cell that supports dynamic UL/DL reconfiguration with traffic adaptation). In this case, how the UE handles a flexible subframe that can be changed between downlink and uplink should be specified. The systems and methods described herein provide procedures for HARQ-ACK generation for TDD-FDD CA when the PCell is a FDD cell on PUCCH format 1b with channel selection, PUCCH format 3 and reporting on PUSCH.

The systems and methods disclosed herein may provide the following benefits. CA in a hybrid duplexing network that includes FDD and TDD cells may operate seamlessly. Resource use may be flexible when both FDD and TDD are used by a UE. HARQ-ACK reporting methods may support the dynamic UL/DL reconfiguration of TDD cells. TDD cell association timings may be extended to FDD cells in a TDD and FDD CA scenario. Additionally, PUCCH reporting cell (e.g., reference cell) configuration by physical (PHY) layer signaling, implicit signaling and/or higher layer signaling may be supported.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more evolved Node Bs (eNBs) 160 and one or more user equipments (UEs) 102 in which systems and methods for carrier aggregation may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

It should be noted that in some configurations, one or more of the UEs 102 described herein may be implemented in a single device. For example, multiple UEs 102 may be combined into a single device in some implementations. Additionally or alternatively, in some configurations, one or more of the eNBs 160 described herein may be implemented in a single device. For example, multiple eNBs 160 may be combined into a single device in some implementations. In the context of FIG. 1, for instance, a single device may include one or more UEs 102 in accordance with the systems and methods described herein. Additionally or alternatively, one or more eNBs 160 in accordance with the systems and methods described herein may be implemented as a single device or multiple devices.

The UE 102 and the eNB 160 may use one or more channels 119, 121 to communicate with each other. For example, a UE 102 may transmit information or data to the eNB 160 using one or more uplink channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more eNBs 160 may also transmit information or data to the one or more UEs 102 using one or more downlink channels 119 and signals, for instance. Examples of downlink channels 119 include a PDCCH, a PDSCH, etc. Examples of downlink signals include a primary synchronization signal (PSS), a Cell-specific reference signal (CRS), and a channel state information (CSI) reference channel (CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UE HARQ-ACK reporting module 126. The UE HARQ-ACK reporting module 126 may include a PUCCH format 1b reporting module 128 and a PUCCH format 3/PUSCH reporting module 130.

The UE HARQ-ACK reporting module 126 may determine a duplex method of each serving cell for FDD and TDD carrier aggregation. The UE 102 may be located in a wireless communication network in which carrier aggregation may be performed with one or more FDD cells and one or more TDD cells. In one implementation, the wireless communication network may be an LTE network.

The UE 102 may communicate with an eNB 160 over a serving cell using either FDD or TDD duplexing. The UE HARQ-ACK reporting module 126 may determine the duplex method of each of the configured serving cells used in FDD and TDD carrier aggregation. In other words, the UE HARQ-ACK reporting module 126 may determine whether a serving cell is a FDD cell or a TDD cell.

The PUCCH format 1b reporting module 128 may generate HARQ-ACK bits for a TDD serving cell when transmitting PDSCH HARQ-ACK information using a PUCCH format 1b with channel selection in a later subframe. In TDD-FDD CA, the primary cell may be an FDD cell and a secondary cell may be a TDD serving cell. If a UE 102 is configured with two cells and PUCCH format 1b with channel selection, then the FDD PUCCH format 1b with channel selection procedures may be reused. In this case, no HARQ-ACK bit will be needed for a UL subframe on the TDD secondary cell, and the PUCCH format 1b reporting module 128 may produce a single FDD cell HARQ-ACK report. Thus, in one configuration, the single FDD cell HARQ-ACK reporting procedure can be used for a subframe where a UL is configured on the secondary TDD serving cell.

In another configuration, for a UL subframe on the TDD SCell, the Format 1b with channel selection tables can be reused by reporting DTX bits for a subframe that is configured as UL on the secondary TDD serving cell. For a subframe that is configured as DL or special subframe on the secondary TDD serving cell, the PUCCH format 1b reporting module 128 may monitor the subframe for PDSCH transmission. For a subframe that is configured as UL on the secondary TDD serving cell, the PUCCH format 1b reporting module 128 may use two DTX bits for a serving cell configured with a downlink transmission mode that supports up to two transport blocks. The PUCCH format 1b reporting module 128 may use one DTX bit for a serving cell configured with a downlink transmission mode that does not support up to two transport blocks.

In another scenario, the secondary cell may be a TDD cell supporting dynamic UL/DL reconfiguration with traffic adaptation (e.g., an eIMTA cell) and the serving cell is configured with a DL HARQ reference configuration by radio resource control (RRC) signaling. If the reconfiguration signaling is correctly detected, and the subframe is a DL or special subframe indicated by a downlink control information (DCI) format for the reconfiguration (e.g., the reconfiguration DCI format), then the PUCCH format 1b reporting module 128 may monitor the subframe for PDSCH transmission. If the reconfiguration signaling is correctly detected, and the subframe is a UL subframe indicated by the reconfiguration DCI format, then the PUCCH format 1b reporting module 128 may use two DTX bits for a serving cell configured with a downlink transmission mode that supports up to two transport blocks, and one DTX bit otherwise.

In this scenario, if the reconfiguration signaling is not correctly detected, and the subframe is a DL or special subframe defined by the TDD UL/DL configuration of the serving cell in the RRCCommonSCell (e.g., the UL HARQ reference configuration), then the PUCCH format 1b reporting module 128 may monitor the subframe for PDSCH transmission. If the subframe is a UL subframe defined by the TDD UL/DL configuration of the serving cell in the RRCCommonSCell (e.g., the UL HARQ reference configuration), then the PUCCH format 1b reporting module 128 may use two DTX bits for a serving cell configured with a downlink transmission mode that supports up to two transport blocks, and one DTX bit otherwise.

Alternatively, if the reconfiguration signaling is not correctly detected, and the subframe is a DL or special subframe defined by the DL HARQ reference configuration in RRC signaling and there is no UL grant associated with the subframe, then the PUCCH format 1b reporting module 128 may monitor the subframe for PDSCH transmission. If the subframe is a UL subframe defined by the DL HARQ reference configuration in RRC signaling, then the PUCCH format 1b reporting module 128 may use two DTX bits for a serving cell configured with a downlink transmission mode that supports up to two transport blocks, and one DTX bit otherwise.

The PUCCH format 3/PUSCH reporting module 130 may generate HARQ-ACK bits for a TDD serving cell when transmitting PDSCH HARQ-ACK information using a PUCCH format 3 or PUSCH in a later subframe. In a TDD-FDD CA scenario the PCell may be a FDD cell, and PUCCH format 3 may be configured. In this scenario, if a PDSCH is received on a secondary cell, the HARQ-ACK bits may be generated and multiplexed for all serving cells. Furthermore, if there is a PUSCH scheduling in a subframe for HARQ-ACK reporting and the HARQ-ACK is reported on PUSCH, the HARQ-ACK multiplexing of PUCCH format 3 may be used. In these cases, there are two procedures to handle the HARQ-ACK bits of a TDD SCell.

In the first procedure, the HARQ-ACK may be reported for a TDD serving cell in all cases. For a PDSCH transmission on the secondary cell indicated by the detection of a corresponding PDCCH/EPDCCH in subframe n−4, the HARQ-ACK bits of all serving cells may be multiplexed together and reported on PUCCH format 3 or a PUSCH transmission.

If a secondary serving cell is a TDD cell, for a subframe that is configured as DL or special subframe on the secondary TDD serving cell, the PUCCH format 3/PUSCH reporting module 130 may monitor the subframe for PDSCH transmission. If a secondary serving cell is a TDD cell, for a subframe that is configured as UL, the PUCCH format 3/PUSCH reporting module 130 may generate and multiplex NACK bits with HARQ-ACK bits of other serving cells. The PUCCH format 3/PUSCH reporting module 130 may use two NACK bits for the serving cell configured with a downlink transmission mode that supports up to two transport blocks, and one NACK bit otherwise.

If a secondary cell is a TDD cell supporting dynamic UL/DL reconfiguration with traffic adaptation (e.g., an eIMTA cell), the serving cell may be configured with a DL HARQ reference configuration by RRC signaling. If the reconfiguration signaling is correctly detected, and the subframe is a DL or special subframe indicated by the reconfiguration DCI format, then the PUCCH format 3/PUSCH reporting module 130 may monitor the subframe for PDSCH transmission. If the reconfiguration signaling is correctly detected, and the subframe is a UL subframe indicated by the reconfiguration DCI format, the PUCCH format 3/PUSCH reporting module 130 may use two NACK bits for a serving cell configured with a downlink transmission mode that support up to two transport blocks, and one NACK bit otherwise.

Determining whether an earlier subframe (e.g., n−4) is an uplink subframe for the TDD serving cell may be based on an uplink/downlink (UL/DL) configuration defined by a radio resource control common secondary cell (RRCCommonSCell) message. If the reconfiguration signaling is not correctly detected, and the subframe is a DL or special subframe defined by the TDD UL/DL configuration of the serving cell in the RRCCommonSCell (e.g., the UL HARQ reference configuration), the PUCCH format 3/PUSCH reporting module 130 may monitor the subframe for PDSCH transmission. If the reconfiguration signaling is not correctly detected, and the subframe is a UL subframe defined by the TDD UL/DL configuration of the serving cell in the RRC-CommonSCell (e.g., the UL HARQ reference configuration), the PUCCH format 3/PUSCH reporting module 130 may use two NACK bits for a serving cell configured with a downlink transmission mode that support up to two transport blocks, and one NACK bit otherwise.

Alternatively, if a secondary cell is a TDD cell supporting dynamic UL/DL reconfiguration with traffic adaptation (e.g., an eIMTA cell) and the cell is configured with a DL HARQ reference configuration by RRC signaling, the reconfiguration signaling may not be correctly detected. If the subframe is a DL or special subframe defined by the DL HARQ reference configuration by RRC signaling and there is no UL grant associated with the subframe, the PUCCH format 3/PUSCH reporting module 130 may monitor the subframe for PDSCH transmission. If the reconfiguration signaling is not correctly detected, and the subframe is a UL subframe defined by the DL HARQ reference configuration by RRC signaling, the PUCCH format 3/PUSCH reporting module 130 may use two NACK bits for a serving cell configured with a downlink transmission mode that support up to two transport blocks, and one NACK bit otherwise.

The UE operations module 124 may provide information 148 to the one or more receivers 120. For example, the UE operations module 124 may inform the receiver(s) 120 when or when not to send PDSCH HARQ-ACK information based on the set of downlink subframe associations.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB HARQ-ACK reporting module 194. The eNB HARQ-ACK reporting module 194 may include a PUCCH format 1b reporting module 196 and a PUCCH format 3/PUSCH reporting module 198.

The eNB HARQ-ACK reporting module 194 may determine a duplex method of each serving cell for FDD and TDD carrier aggregation. The eNB 160 may communicate with a UE 102 over a serving cell using either FDD or TDD duplexing. The eNB HARQ-ACK reporting module 194 may determine the duplex method of each of the configured serving cells used in FDD and TDD carrier aggregation. In other words, the eNB HARQ-ACK reporting module 194 may determine whether a serving cell is a FDD cell or a TDD cell.

The PUCCH format 1b reporting module 196 may receive HARQ-ACK information when receiving PDSCH HARQ-ACK information using a PUCCH format 1b with channel selection in a later subframe. If a UE 102 is configured with two cells and PUCCH format 1b with channel selection, then the FDD PUCCH format 1b with channel selection procedures may be reused. In this case, no HARQ-ACK bit will be needed for a UL subframe on a TDD secondary cell, and the PUCCH format 1b reporting module 196 may receive a single FDD cell HARQ-ACK report.

In another configuration, for a UL subframe on the TDD SCell, the Format 1b with channel selection tables can be reused by reporting DTX bits for a subframe that is configured as UL on the secondary TDD serving cell. Therefore, for a subframe that is configured as DL or special subframe on the secondary TDD serving cell, the PUCCH format 1b reporting module 196 may receive HARQ-ACK information for the earlier subframe. For a subframe that is configured as UL on the secondary TDD serving cell, the PUCCH format 1b reporting module 196 may not receive HARQ-ACK information corresponding to the UL subframe on the TDD SCell.

In another scenario, the secondary cell may be a TDD cell supporting dynamic UL/DL reconfiguration with traffic adaptation (e.g., an eIMTA cell) and the serving cell is configured with a DL HARQ reference configuration by RRC signaling. The PUCCH format 1b reporting module 196 may not receive HARQ-ACK information corresponding to the UL subframe on the TDD SCell. This is due to the UE 102 setting at least one discontinuous transmission (DTX) bit to a HARQ-ACK bit for the UL subframe of the TDD serving cell.

The PUCCH format 3/PUSCH reporting module 198 may receive HARQ-ACK information for a TDD serving cell when receiving PDSCH HARQ-ACK information using a PUCCH format 3 or PUSCH in a later subframe. In a first procedure, the HARQ-ACK information may be reported for a TDD serving cell in all cases. For a PDSCH transmission on the secondary cell indicated by the detection of a corresponding PDCCH/EPDCCH in an earlier subframe (e.g., n−4), the HARQ-ACK bits of all serving cells may be multiplexed together and reported on PUCCH format 3 or a PUSCH transmission.

If a secondary serving cell is a TDD cell, for a subframe that is configured as UL, the PUCCH format 3/PUSCH reporting module 198 may receive one or more NACKs for the TDD serving cell. The one or more NACKs for the TDD serving cell may be multiplexed with HARQ-ACK bits of other serving cells. The PUCCH format 3/PUSCH reporting module 198 may receive two NACK bits for the serving cell configured with a downlink transmission mode that supports up to two transport blocks, and one NACK bit otherwise.

The eNB operations module 182 may provide information 190 to the one or more receivers 178. For example, the eNB operations module 182 may inform the receiver(s) 178 when or when not to receive PDSCH HARQ-ACK information based on the set of downlink subframe associations.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
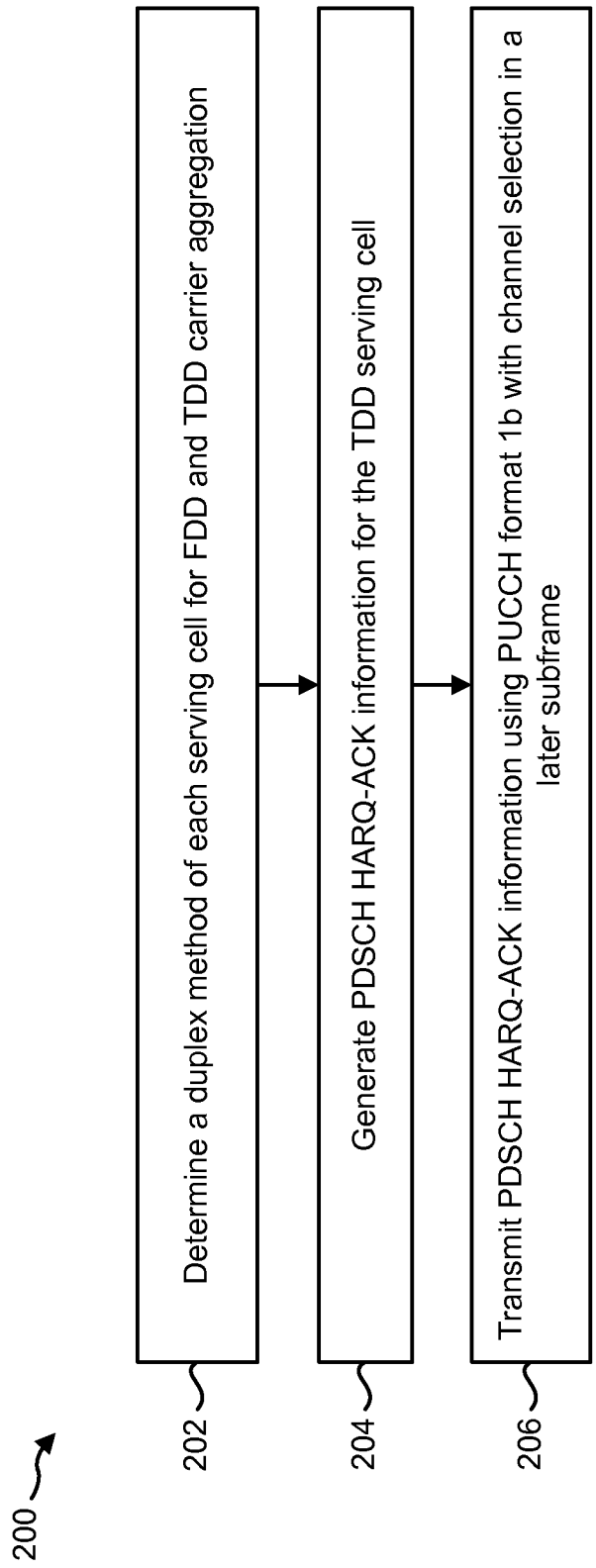
FIG. 2 is a flow diagram illustrating one implementation of a method for performing carrier aggregation by a UE.

FIG. 2 is a flow diagram illustrating one implementation of a method 200 for performing carrier aggregation by a UE 102. The UE 102 may be located in a wireless communication network in which carrier aggregation may be performed with one or more FDD cells and one or more TDD cells. In one implementation, the wireless communication network may be an LTE network.

The UE 102 may communicate with an eNB 160 over a serving cell using either FDD or TDD duplexing. A serving cell may be a set of communication channels 119, 121. During carrier aggregation (CA), more than one serving cell may be aggregated to a UE 102. In one configuration, the primary cell is a FDD cell. A secondary cell may be a TDD serving cell. A physical downlink shared channel (PDSCH) transmission may be sent in an earlier subframe (e.g., subframe n−4) for the serving cell.

The UE 102 may determine 202 the duplex method of each of the configured serving cells used in FDD and TDD carrier aggregation. In other words, the UE 102 may determine 202 whether a serving cell is a FDD cell or a TDD cell.

The UE 102 may generate 204 PDSCH HARQ-ACK information for the TDD serving cell. Different combinations of uplink control information (UCI) on PUCCH may be supported in different PUCCH formats. For example, format 1a may be used for 1-bit HARQ-ACK or in the case of FDD for 1-bit HARQ-ACK with positive scheduling request (SR). Format 1b may be used for 2-bit HARQ-ACK or for 2-bit HARQ-ACK with positive SR. Format 1b may be used for up to 4-bit HARQ-ACK with channel selection when the UE 102 is configured with more than one serving cell or, in the case of TDD, when the UE 102 is configured with a single serving cell. Format 1 may be used for positive SR.

A PUCCH format 2 may be used for a CSI report when not multiplexed with HARQ-ACK. Format 2a may be used for a CSI report multiplexed with 1-bit HARQ-ACK for a normal cyclic prefix. Format 2b may be used for a CSI report multiplexed with 2-bit HARQ-ACK for a normal cyclic prefix. Format 2 may also be used for a CSI report multiplexed with HARQ-ACK for an extended cyclic prefix.

A PUCCH format 3 may be used for up to 10-bit HARQ-ACK for FDD and for up to 20-bit HARQ-ACK for TDD. Format 3 may also be used for up to 11-bit corresponding to 10-bit HARQ-ACK and 1-bit positive/negative SR for FDD and for up to 21-bit corresponding to 20-bit HARQ-ACK and 1-bit positive/negative SR for TDD. Format 3 may further be used for HARQ-ACK, 1-bit positive/negative SR (if any) and a CSI report for one serving cell.

In one scenario, a UE 102 may be configured with PUCCH format 3 and HARQ-ACK transmission on PUSCH or using PUCCH format 3. Alternatively, the UE 102 may be configured with two serving cells and PUCCH format 1b with channel selection and HARQ-ACK transmission on PUSCH. In yet another alternative configuration, the UE 102 may be configured with one serving cell and PUCCH format 1b with channel selection and HARQ-ACK transmission on PUSCH.

In this scenario, if the configured downlink transmission mode for a serving cell supports up to two transport blocks and only one transport block is received in a subframe, the UE 102 may generate a NACK for the other transport block if spatial HARQ-ACK bundling is not applied.

If neither PDSCH nor physical downlink control channel (PDCCH)/enhanced physical downlink control channel (EPDCCH) indicating downlink SPS release is detected in a subframe for a serving cell, then the UE 102 may generate two NACKs when the configured downlink transmission mode supports up to two transport blocks. Furthermore, the UE 102 may generate a single NACK when the configured downlink transmission mode supports a single transport block. The two NACKs may be multiplexed with HARQ-ACK bits of other serving cells.

If a primary cell is FDD and an earlier subframe (e.g., n−4) is an uplink subframe for a TDD serving cell, then for the later subframe (e.g., n) for the serving cell, the UE 102 may generate two NACKs when the configured downlink transmission mode supports up to two transport blocks. The UE 102 may also generate a single NACK when the configured downlink transmission mode supports a single transport block. The single NACK may be multiplexed with HARQ-ACK bits of other serving cells.

In another scenario for FDD as a primary cell with PUCCH format 1a/1b transmission, both HARQ-ACK and SR may be transmitted in the same subframe. In this scenario, a UE 102 may transmit the HARQ-ACK on its assigned HARQ-ACK PUCCH format 1a/1b resource for a negative SR transmission and may transmit the HARQ-ACK on its assigned SR PUCCH resource for a positive SR transmission.

In another scenario for FDD as a primary cell with PUCCH format 1b with channel selection, both HARQ-ACK and SR may be transmitted in the same subframe. A UE 102 may transmit the HARQ-ACK on its assigned HARQ-ACK PUCCH resource with channel selection for a negative SR transmission and may transmit one HARQ-ACK bit per serving cell on its assigned SR PUCCH resource for a positive SR transmission.

In this scenario, if only one transport block or a PDCCH/EPDCCH indicating downlink SPS release is detected on a serving cell, then the HARQ-ACK bit for the serving cell is the HARQ-ACK bit corresponding to the transport block or the PDCCH/EPDCCH indicating downlink SPS release. If two transport blocks are received on a serving cell, the HARQ-ACK bit for the serving cell may be generated by spatially bundling the HARQ-ACK bits corresponding to the transport blocks. If neither PDSCH transmission for which HARQ-ACK response is provided nor PDCCH/EPDCCH indicating downlink SPS release is detected for a serving cell, the HARQ-ACK bit for the serving cell may be set to NACK. The HARQ-ACK bits for the primary cell and the secondary cell may be mapped to b(0) and b(1) bits, respectively.

The b(0) and b(1) bits may be transmitted on a PUCCH resource based on the channel selection tables below. In Table (1) (based on 3GPP TS 36.213, Table 10.1.2.2.1-3), A=2. In Table (2) (based on 3GPP TS 36.213, Table 10.1.2.2.1-4), A=3. In Table (3) (based on 3GPP TS 36.213, Table 10.1.2.2.1-5), A=4.

In yet another scenario for FDD as a primary cell, a PUCCH format 3 transmission of HARQ-ACK may coincide with a sub-frame configured to the UE 102 by higher layers for transmission of a scheduling request. The UE 102 may multiplex HARQ-ACK and SR bits on HARQ-ACK PUCCH. If the HARQ-ACK corresponds to a PDSCH transmission on the primary cell only or a PDCCH/EPDCCH indicating downlink SPS release on the primary cell only, then the SR may be transmitted as for FDD as a primary cell with PUCCH format 1a/1b.

For FDD as a primary cell and for a PUSCH transmission, a UE 102 may not transmit HARQ-ACK on PUSCH in subframe n if the UE 102 does not receive PDSCH or PDCCH indicating downlink SPS release in subframe n−4. When only a positive SR is transmitted, a UE 102 may use PUCCH Format 1 for the SR resource.

In TDD-FDD CA, the primary cell may be an FDD cell and a secondary cell may be a TDD serving cell. If a UE 102 is configured with two cells and PUCCH format 1b with channel selection, then the FDD PUCCH format 1b with channel selection methods can be reused. However, the TDD secondary cell may have a UL subframe. In this case, no HARQ-ACK bit will be needed for the UL subframe on the TDD secondary cell. A single FDD cell HARQ-ACK report may be transmitted. Thus, in one configuration, the single FDD cell HARQ-ACK reporting procedure can be used for a subframe where a UL is configured on the secondary TDD serving cell.

In another configuration, for a UL subframe on the TDD SCell, the Format 1b with channel selection tables can be reused by reporting DTX bits for a subframe that is configured as UL on the secondary TDD serving cell. For a subframe that is configured as DL or special subframe on the secondary TDD serving cell, the UE 102 may monitor the earlier subframe (e.g., n−4) for a PDSCH transmission. When transmitting PDSCH HARQ-ACK information using a PUCCH format 1b with channel selection in a later subframe, the UE 102 may set at least one discontinuous transmission (DTX) bit to a HARQ-ACK bit for the TDD serving cell. For example, for a subframe that is configured as UL on the secondary TDD serving cell, the UE 102 may use two DTX bits for a serving cell configured with a downlink transmission mode that supports up to two transport blocks. The UE 102 may use one DTX bit for a serving cell configured with a downlink transmission mode that does not support up to two transport blocks.

In another scenario, determining whether an earlier subframe (e.g., n−4) is an uplink subframe for the TDD serving cell may be based on an explicit reconfiguration downlink control information (DCI) signaling of the TDD serving cell. The secondary cell may be a TDD cell supporting dynamic UL/DL reconfiguration with traffic adaptation (e.g., an eIMTA cell) and the serving cell is configured with a DL HARQ reference configuration by RRC signaling. If the reconfiguration signaling is correctly detected, and the subframe is a DL or special subframe indicated by a downlink control information (DCI) format for the reconfiguration (e.g., the reconfiguration DCI format), then the UE 102 may monitor the subframe for PDSCH transmission. If the reconfiguration signaling is correctly detected, and the subframe is a UL subframe indicated by the reconfiguration DCI format, then the UE 102 may use two DTX bits for a serving cell configured with a downlink transmission mode that supports up to two transport blocks, and one DTX bit otherwise.

In this scenario, determining whether the earlier subframe is an uplink subframe for the TDD serving cell may be based on an uplink/downlink (UL/DL) configuration defined by a radio resource control common secondary cell (RRCCommonSCell) message. If the reconfiguration signaling is not correctly detected, and the subframe is a DL or special subframe defined by the TDD UL/DL configuration of the serving cell in the RRCCommonSCell (e.g., the UL HARQ reference configuration), then the UE 102 may monitor the subframe for a PDSCH transmission. If the subframe is a UL subframe defined by the TDD UL/DL configuration of the serving cell in the RRCCommonSCell (e.g., the UL HARQ reference configuration), then the UE 102 may use two DTX bits for a serving cell configured with a downlink transmission mode that supports up to two transport blocks, and one DTX bit otherwise. With this configuration, a PDSCH transmission on the secondary cell may be missed and reported as DTX, but there is no new UE 102 behavior for monitoring a subframe. In this configuration, the UE 102 knows the type of the subframe (e.g., UL, DL, or special subframe).

Alternatively, if the reconfiguration signaling is not correctly detected, and the subframe is a DL or special subframe defined by the DL HARQ reference configuration in RRC signaling and there is no UL grant associated with the subframe, then the UE 102 may monitor the subframe for PDSCH transmission. If the subframe is a UL subframe defined by the DL HARQ reference configuration in RRC signaling, then the UE 102 may use two DTX bits for a serving cell configured with a downlink transmission mode that supports up to two transport blocks, and one DTX bit otherwise. With this configuration, the potential PDSCH transmission is monitored, but new UE 102 behavior may be introduced for monitoring a subframe. In this configuration, the UE 102 may not be certain of the type of the subframe (e.g., UL, DL, or special subframe).

Tables (1)-(3) below show the masked PUCCH format 1b with channel selection tables. In Tables (1)-(3), A is the number of PUCCH resources and $n_{PUCCH}^{(1)}$ is a PUCCH resource. In Table (1) (based on 3GPP TS 36.213 v11.4.0, Table 10.1.2.2.1-3), A=2. In Table (2) (based on 3GPP TS 36.213 v11.4.0, Table 10.1.2.2.1-4), A=3. In Table (3) (based on 3GPP TS 36.213 v11.4.0, Table 10.1.2.2.1-5), A=4.

TABLE 1

| HARQ-ACK(0) | HARQ-ACK(1) | $n_{PUCCH}^{(1)}$ | b(0)b(1) |
|---|---|---|---|
| ACK | ACK | $n_{PUCCH,1}^{(1)}$ | 1,1 |
| ACK | NACK/DTX | $n_{PUCCH,0}^{(1)}$ | 1,1 |
| NACK/DTX | ACK | $n_{PUCCH,1}^{(1)}$ | 0,0 |
| NACK | NACK/DTX | $n_{PUCCH,0}^{(1)}$ | 0,0 |
| DTX | NACK/DTX | No Transmission | |

TABLE 2

| HARQ-ACK(0) | HARQ-ACK(1) | HARQ-ACK(2) | $n_{PUCCH}^{(1)}$ | b(0)b(1) |
|---|---|---|---|---|
| ACK | ACK | ACK | $n_{PUCCH,1}^{(1)}$ | 1,1 |
| ACK | NACK/DTX | ACK | $n_{PUCCH,1}^{(1)}$ | 1,0 |
| NACK/DTX | ACK | ACK | $n_{PUCCH,1}^{(1)}$ | 0,1 |
| NACK/DTX | NACK/DTX | ACK | $n_{PUCCH,2}^{(1)}$ | 1,1 |
| ACK | ACK | NACK/DTX | $n_{PUCCH,0}^{(1)}$ | 1,1 |
| ACK | NACK/DTX | NACK/DTX | $n_{PUCCH,0}^{(1)}$ | 1,0 |
| NACK/DTX | ACK | NACK/DTX | $n_{PUCCH,0}^{(1)}$ | 0,1 |
| NACK/DTX | NACK/DTX | NACK | $n_{PUCCH,2}^{(1)}$ | 0,0 |
| NACK | NACK/DTX | DTX | $n_{PUCCH,0}^{(1)}$ | 0,0 |
| NACK/DTX | NACK | DTX | $n_{PUCCH,0}^{(1)}$ | 0,0 |
| DTX | DTX | DTX | No Transmission | |

TABLE 3

| HARQ-ACK(0) | HARQ-ACK(1) | HARQ-ACK(2) | HARQ-ACK(3) | $n_{PUCCH}^{(1)}$ | b(0)b(1) |
|---|---|---|---|---|---|
| ACK | ACK | ACK | ACK | $n_{PUCCH,1}^{(1)}$ | 1,1 |
| ACK | NACK/DTX | ACK | ACK | $n_{PUCCH,2}^{(1)}$ | 0,1 |
| NACK/DTX | ACK | ACK | ACK | $n_{PUCCH,1}^{(1)}$ | 0,1 |
| NACK/DTX | NACK/DTX | ACK | ACK | $n_{PUCCH,3}^{(1)}$ | 1,1 |
| ACK | ACK | ACK | NACK/DTX | $n_{PUCCH,1}^{(1)}$ | 1,0 |
| ACK | NACK/DTX | ACK | NACK/DTX | $n_{PUCCH,2}^{(1)}$ | 0,0 |
| NACK/DTX | ACK | ACK | NACK/DTX | $n_{PUCCH,1}^{(1)}$ | 0,0 |
| NACK/DTX | NACK/DTX | ACK | NACK/DTX | $n_{PUCCH,3}^{(1)}$ | 1,0 |
| ACK | ACK | NACK/DTX | ACK | $n_{PUCCH,2}^{(1)}$ | 1,1 |
| ACK | NACK/DTX | NACK/DTX | ACK | $n_{PUCCH,2}^{(1)}$ | 1,0 |
| NACK/DTX | ACK | NACK/DTX | ACK | $n_{PUCCH,3}^{(1)}$ | 0,1 |
| NACK/DTX | NACK/DTX | NACK/DTX | ACK | $n_{PUCCH,3}^{(1)}$ | 0,0 |
| ACK | ACK | NACK/DTX | NACK/DTX | $n_{PUCCH,0}^{(1)}$ | 1,1 |
| ACK | NACK/DTX | NACK/DTX | NACK/DTX | $n_{PUCCH,0}^{(1)}$ | 1,0 |
| NACK/DTX | ACK | NACK/DTX | NACK/DTX | $n_{PUCCH,0}^{(1)}$ | 0,1 |
| NACK/DTX | NACK | NACK/DTX | NACK/DTX | $n_{PUCCH,0}^{(1)}$ | 0,0 |
| NACK | NACK/DTX | NACK/DTX | NACK/DTX | $n_{PUCCH,0}^{(1)}$ | 0,0 |
| DTX | DTX | NACK/DTX | NACK/DTX | No Transmission | |

Since the PUCCH resources may be implicitly determined by the PDSCH allocation, the SCell PUCCH resource may not be reserved for a subframe that is configured as UL on the secondary TDD serving cell. Therefore, for simplicity of the specification, the TDD-FDD CA PUCCH format 1b with channel selection may follow FDD CA. For PUCCH format 1b with channel selection, the "FDD as primary cell" may include the cases of two FDD cells and two serving cells and the primary cell is a FDD cell and the secondary cell is a TDD cell.

It should be noted that the condition "for FDD as a primary cell with two configured serving cells and PUCCH format 1b with channel selection" may also be referred to as "for FDD with two configured serving cells and two configured serving cells with a FDD cell as primary cell and a TDD cell as a secondary cell, and PUCCH format 1b with channel selection."

The UE 102 may transmit 206 PDSCH HARQ-ACK information using PUCCH format 1b with channel selection in a later subframe (e.g., subframe n). The PDSCH HARQ-ACK information for the TDD serving cell may be multiplexed with the other serving cells as described in connection with FIG. 4. The PDSCH HARQ-ACK information may then be sent to the eNB 160 using PUCCH format 1b with channel selection.

The FDD as a primary cell HARQ-ACK feedback procedures for more than one configured serving cell may be based either on a PUCCH format 1b with channel selection HARQ-ACK procedure (as described in connection with FIG. 2) or a PUCCH format 3 HARQ-ACK procedure (as described in connection with FIG. 3). HARQ-ACK transmission on two antenna ports (p∈[$p_0,p_1$]) is supported for PUCCH format 3. Furthermore, HARQ-ACK transmission on two antenna ports p∈[$p_0,p_1$] is supported for PUCCH format 1b with channel selection and FDD as a primary cell with two configured serving cells.

For a PDSCH transmission associated with the serving cell c in subframe n−4, where the serving cell c is a TDD cell and the subframe n−4 is an uplink subframe for the serving cell c, HARQ-ACK (j) in subframe n may be set to DTX.

For FDD as a primary cell with two configured serving cells and PUCCH format 1b with channel selection, the UE 102 may transmit b(0)b(1) on PUCCH resource $n_{PUCCH}^{(1,\tilde{p})}$ for $\tilde{p}$ mapped to antenna port p using PUCCH format 1b. In one configuration, $n_{PUCCH}^{(1,\tilde{p}_0)}=n_{PUCCH}^{(1)}$ for antenna port $p_0$ where $n_{PUCCH}^{(1)}$ is selected from A PUCCH resources, $n_{PUCCH,j}^{(1)}$ where 0≤j≤A−1 and A∈{2,3,4}, according to Table (1), (2) and (3) in subframe n. HARQ-ACK(j) denotes the ACK/NACK/DTX response for a transport block or SPS release PDCCH/EPDCCH associated with serving cell c, where the transport block and serving cell for HARQ-ACK (j) and A PUCCH resources are given by Table (4) (from 3GPP TS 36.213 v11.4.0, Table 10.1.2.2.1-1) below.

TABLE 4

| HARQ-ACK(j) | | | |
|---|---|---|---|
| HARQ-ACK(0) | HARQ-ACK(1) | HARQ-ACK(2) | HARQ-ACK(3) |
| 2 TB1 Primary cell | TB1 Secondary cell | NA | NA |
| 3 TB1 Serving cell1 | TB2 Serving cell1 | TB1 Serving cell2 | NA |
| 4 TB1 Primary cell | TB2 Primary cell | TB1 Secondary cell | TB2 Secondary cell |

When the UE 102 is configured with two antenna port transmission for PUCCH format 1b with channel selection, $n_{PUCCH}^{(1,\tilde{p}_1)}$ may be used for antenna port $p_1$. $n_{PUCCH}^{(1,\tilde{p}_1)}$ is selected from A PUCCH resources. $n_{PUCCH,j}^{(1,\tilde{p}_1)}$ may be configured by higher layers, where 0≤j≤A−1 and A∈{2,3,4}, according to Table (1), (2) and (3) by replacing $n_{PUCCH}^{(1)}$ with $n_{PUCCH}^{(1,\tilde{p}_1)}$ and replacing $n_{PUCCH,i}^{(1)}$ with $n_{PUCCH,i}^{(1,\tilde{p}_1)}$ in subframe n.

If a UE 102 is configured with a transmission mode that supports up to two transport blocks on serving cell c, then the UE 102 may use the same HARQ-ACK response for both the transport blocks in response to a PDSCH transmission with a single transport block or a PDCCH/EPDCCH indicating downlink SPS release associated with the serving cell c.

The UE 102 may determine the A PUCCH resources, $n_{PUCCH,j}^{(1)}$ associated with HARQ-ACK(j), where 0≤j≤A−1 in Table (4). In a first case, for a PDSCH transmission indicated by the detection of a corresponding PDCCH in subframe n−4 on the primary cell, or for a PDCCH indicating downlink SPS release in subframe n−4 on the primary cell, the PUCCH resource is $n_{PUCCH,j}^{(1)}=n_{CCE}+N_{PUCCH}^{(1)}$. $n_{CCE}$ is the number of the first control channel element (CCE) used for transmission of the corresponding PDCCH and $N_{PUCCH}^{(1)}$ is configured by higher layers. For a transmission mode that supports up to two transport blocks, the PUCCH resource $n_{PUCCH,j+1}^{(1)}$ is given by $n_{PUCCH,j+1}^{(1)}=n_{CCE}+1+N_{PUCCH}^{(1)}$.

In a second case, for a PDSCH transmission on the primary cell where there is not a corresponding PDCCH/EPDCCH detected in subframe n−4, the value of $n_{PUCCH,j}^{(1)}$ may be determined according to higher layer configuration and Table (5) (from 3GPP TS 36.213 v11.4.0, Table 9.2-2). For a transmission mode that supports up to two transport blocks, the PUCCH resource $n_{PUCCH,j+1}^{(1)}$ is given by $n_{PUCCH,j+1}^{(1)}=n_{PUCCH,j}^{(1)}+1$.

TABLE 5

| Value of 'TPC command for PUCCH' | $n_{PUCCH}^{(1,\tilde{p})}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

In a third case, for a PDSCH transmission indicated by the detection of a corresponding PDCCH/EPDCCH in subframe n−4 on the secondary cell, the value of $n_{PUCCH,j}^{(1)}$ and the value of $n_{PUCCH,j+1}^{(1)}$ for the transmission mode that supports up to two transport blocks may be determined according to higher layer configuration and Table (6) (from 3GPP TS 36.213 v11.4.0, Table 10.1.2.2.1-2) below. The transmitter power control (TPC) field in the DCI format of the corresponding PDCCH/EPDCCH may be used to determine the PUCCH resource values from one of the four resource values configured by higher layers, with the mapping defined in Table (6). For a UE 102 configured for a transmission mode that supports up to two transport blocks, a PUCCH resource value in Table (6) maps to two PUCCH resources ($n_{PUCCH,j}^{(1)}, n_{PUCCH,j+1}^{(1)}$), otherwise, the PUCCH resource value maps to a single PUCCH resource $n_{PUCCH,j}^{(1)}$.

TABLE 6

| Value of 'TPC command for PUCCH' | $n_{PUCCH,j}^{(1)}$ or ($n_{PUCCH,j}^{(1)}, n_{PUCCH,j+1}^{(1)}$) |
|---|---|
| '00' | The 1st PUCCH resource value configured by the higher layers |
| '01' | The 2$^{nd}$ PUCCH resource value configured by the higher layers |
| '10' | The 3$^{rd}$ PUCCH resource value configured by the higher layers |
| '11' | The 4$^{th}$ PUCCH resource value configured by the higher layers |

NOTE:
($n_{PUCCH,j}^{(1)}, n_{PUCCH,j+1}^{(1)}$) are determined from the first and second PUCCH resource lists configured by n1PUCCH-AN-CS-List-r10, respectively.

In a fourth case, a PDSCH transmission may be indicated by the detection of a corresponding EPDCCH in subframe n−4 on the primary cell, or an EPDCCH may indicate downlink SPS release in subframe n−4 on the primary cell. In this case, if EPDCCH-PRB-set q is configured for distributed transmission, the PUCCH resource may be given by $n_{PUCCH,j}^{(1)} = n_{ECCE,q} + \Delta_{ARO} + N_{PUCCH,q}^{(e1)}$. If EPDCCH-PRB-set q is configured for localized transmission, the PUCCH resource may be given by $$n_{PUCCH,j}^{(1)} = \left\lfloor \frac{{}^n ECCE, q}{N_{RB}^{ECCE,q}} \right\rfloor \cdot N_{RB}^{ECCE,q} + n' + \Delta_{ARO} + N_{PUCCH,q}^{(e1)}.$$

In one configuration, $n_{ECCE,q}$ is the number of the first enhanced control channel element (ECCE) (e.g., the lowest ECCE index used to construct the EPDCCH) used for transmission of the corresponding DCI assignment in EPDCCH-PRB-set q. $\Delta_{ARO}$ is determined from the HARQ-ACK resource offset field in the DCI format of the corresponding EPDCCH as given in Table (7) (from 3GPP TS 36.213 v11.4.0, Table 10.1.2.1-1). $N_{PUCCH,q}^{(e1)}$ EPDCCH-PRB-set q may be configured by the higher layer parameter pucch-ResourceStartOffset-r11. n' may be determined from the antenna port used for localized EPDCCH transmission. $N_{RB}^{ECCE,q}$ the number of ECCEs per resource-block pair for EPDCCH-PRB-set q. $N_{RB}^{ECCE} = 16/N_{EREG}^{ECCE}$, where $N_{EREG}^{ECCE}$ is the number of enhanced resource element groups (EREGs) per ECCE.

TABLE 7

| ACK/NACK Resource offset field in DCI format 1A/1B/1D/1/2A/2/2B/2C/2D | $\Delta_{ARO}$ |
|---|---|
| 0 | 0 |
| 1 | −1 |
| 2 | −2 |
| 3 | 2 |

In the case where a PDSCH transmission may be indicated by the detection of a corresponding EPDCCH in subframe n−4 on the primary cell, or an EPDCCH may indicate downlink SPS release in subframe n−4 on the primary cell, the PUCCH resource $n_{PUCCH,j+1}^{(1)}$ may be determined for a transmission mode that supports up to two transport blocks. If EPDCCH-PRB-set q is configured for distributed transmission, then $n_{PUCCH,j+1}^{(1)} = n_{ECCE,q} + 1 + \Delta_{ARO} + N_{PUCCH,q}^{(e1)}$. If EPDCCH-PRB-set q is configured for localized transmission, then $$n_{PUCCH,j+1}^{(1)} = \left\lfloor \frac{{}^n ECCE, q}{N_{RB}^{ECCE,q}} \right\rfloor \cdot N_{RB}^{ECCE,q} + 1 + n' + \Delta_{ARO} + N_{PUCCH,q}^{(e1)}.$$

Figure 3:
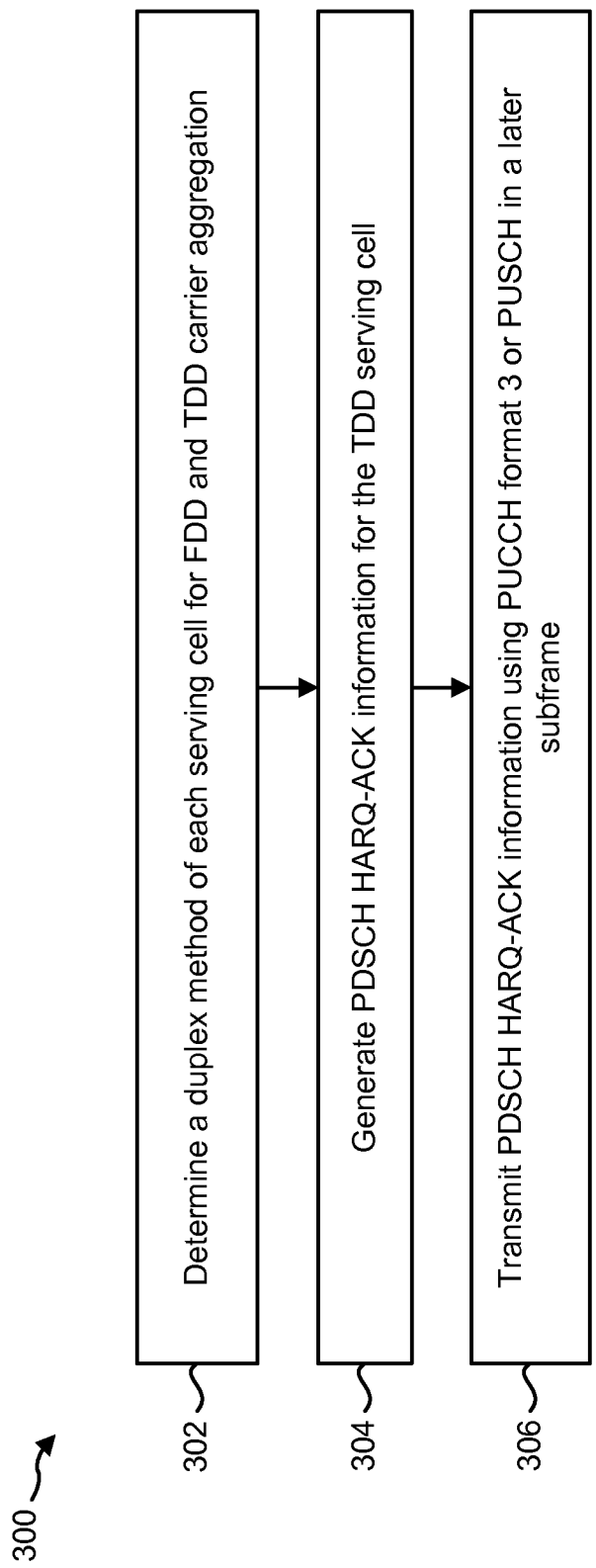
FIG. 3 is a flow diagram illustrating another implementation of a method for performing carrier aggregation by a UE.

FIG. 3 is a flow diagram illustrating another implementation of a method 300 for performing carrier aggregation by a UE 102. The UE 102 may be located in a wireless communication network in which carrier aggregation may be performed with one or more FDD cells and one or more TDD cells. In one implementation, the wireless communication network may be an LTE network.

The UE 102 may communicate with an eNB 160 over a serving cell using either FDD or TDD duplexing. During carrier aggregation (CA), more than one serving cell may be aggregated to a UE 102. In one configuration, the primary cell is a FDD cell. A secondary cell may be a TDD serving cell. A physical downlink shared channel (PDSCH) transmission may be sent in an earlier subframe (e.g., subframe n−4) for the serving cell.

The UE 102 may determine 302 the duplex method of each of the configured serving cells used in FDD and TDD carrier aggregation. In other words, the UE 102 may determine 302 whether a serving cell is a FDD cell or a TDD cell.

The UE 102 may generate 304 PDSCH HARQ-ACK information for the TDD serving cell. In TDD-FDD CA scenario, a UE 102 may be configured with two or more cells. The PCell may be a FDD cell, and PUCCH format 3 may be configured. In this scenario, if a PDSCH is received on a secondary cell, the HARQ-ACK bits should be generated and multiplexed for all serving cells. Furthermore, if there is a PUSCH scheduling in a subframe for HARQ-ACK reporting, and the HARQ-ACK is reported on PUSCH, the HARQ-ACK multiplexing of PUCCH format 3 may be used. In these cases, there are two procedures to handle the HARQ-ACK bits of a TDD SCell.

In the first procedure, the HARQ-ACK may be reported for a TDD serving cell in all cases. For a PDSCH transmission on the secondary cell indicated by the detection of a corresponding PDCCH/EPDCCH in subframe n−4, the HARQ-ACK bits of all serving cells may be multiplexed together and reported on PUCCH format 3 or a PUSCH transmission.

If a secondary serving cell is a TDD cell, for a subframe that is configured as DL or special subframe on the secondary TDD serving cell, the UE 102 may monitor the subframe for PDSCH transmission. If a secondary serving cell is a TDD cell, for a subframe that is configured as UL, NACK may be generated and multiplexed with HARQ-ACK bits of other serving cells. The UE 102 may use two NACK bits for the serving cell configured with a downlink transmission mode that supports up to two transport blocks, and one NACK bit otherwise.

If a secondary cell is a TDD cell supporting dynamic UL/DL reconfiguration with traffic adaptation (e.g., an eIMTA cell), the serving cell may be configured with a DL HARQ reference configuration by RRC signaling. If the reconfiguration signaling is correctly detected, and the subframe is a DL or special subframe indicated by the reconfiguration DCI format, then the UE 102 may monitor the subframe for PDSCH transmission. If the reconfiguration signaling is correctly detected, and the subframe is a UL subframe indicated by the reconfiguration DCI format, the UE 102 may use two NACK bits for a serving cell configured with a downlink transmission mode that supports up to two transport blocks, and one NACK bit otherwise.

Determining whether an earlier subframe (e.g., subframe n−4) is an uplink subframe for the TDD serving cell may be based on an uplink/downlink (UL/DL) configuration defined by a radio resource control common secondary cell (RRC-CommonSCell) message. If the reconfiguration signaling is not correctly detected, and the subframe is a DL or special subframe defined by the TDD UL/DL configuration of the serving cell in the RRCCommonSCell (e.g., the UL HARQ reference configuration), the UE 102 may monitor the subframe for PDSCH transmission. If the reconfiguration signaling is not correctly detected, and the subframe is a UL subframe defined by the TDD UL/DL configuration of the serving cell in the RRCCommonSCell (e.g., the UL HARQ reference configuration), the UE 102 may use two NACK bits for a serving cell configured with a downlink transmission mode that support up to two transport blocks, and one NACK bit otherwise.

Alternatively, for a secondary cell is a TDD cell supporting dynamic UL/DL reconfiguration with traffic adaptation (e.g., an eIMTA cell) and the cell is configured with a DL HARQ reference configuration by RRC signaling, the reconfiguration signaling may not be correctly detected. If the subframe is a DL or special subframe defined by the DL HARQ reference configuration by RRC signaling and there is no UL grant associated with the subframe, the UE 102 should monitor the subframe for PDSCH transmission. If the reconfiguration signaling is not correctly detected, and the subframe is a UL subframe defined by the DL HARQ reference configuration by RRC signaling, the UE 102 may use two NACK bits for a serving cell configured with a downlink transmission mode that support up to two transport blocks, and one NACK bit otherwise.

The UE 102 may transmit 306 PDSCH HARQ-ACK information using PUCCH format 3 or PUSCH in a later subframe. The PDSCH HARQ-ACK information for the TDD serving cell may be multiplexed with the other serving cells as described in connection with FIG. 4. The PDSCH HARQ-ACK information may then be sent to the eNB 160.

It should be noted that the first procedure described in connection with FIG. 3 may reuse FDD CA rules for HARQ-ACK multiplexing and reporting. Therefore, this procedure may result in minimal specification changes. However, this procedure generates unnecessary HARQ-ACK bits for the HARQ-ACK reporting on PUCCH and PUSCH. For the PUCCH, this procedure will potentially cause PUCCH performance degradation. For the PUSCH, more HARQ-ACK bits means more resources are used by the HARQ-ACK multiplexing, which may reduce the performance of PUSCH data transmission.

In a second procedure, no HARQ-ACK is reported for a fixed UL subframe in a TDD cell. For a PDSCH transmission on the secondary cell indicated by the detection of a corresponding PDCCH/EPDCCH in subframe n−4, the HARQ-ACK bits of all serving cells may be multiplexed together and reported on PUCCH format 3 or a PUSCH transmission.

If a secondary serving cell is a TDD cell, for a subframe that is configured as DL or special subframe on the secondary TDD serving cell, the UE 102 may monitor the subframe for PDSCH transmission. The UE 102 may generate HARQ-ACK bits accordingly. If a secondary serving cell is a TDD cell, for a subframe that is configured as UL, no HARQ-ACK bit is generated for the serving cell.

For a TDD cell that is an eIMTA cell, the UL/DL configuration can be changed dynamically. Occasionally, the UE 102 may misdetect a reconfiguration DCI format. To avoid potential issues and provide a consistent HARQ-ACK payload for each subframe, no HARQ-ACK is reported in the fixed UL subframes (e.g., the UL subframes indicated by the DL HARQ reference configuration by RRC signaling). NACK may be reported for a subframe with unclear subframe type if the reconfiguration DCI signaling is not correctly detected. Therefore, if a secondary cell is a TDD cell supporting dynamic UL/DL reconfiguration with traffic adaptation (e.g., an eIMTA cell) and the serving cell is configured with a DL HARQ reference configuration by RRC signaling, for a subframe that is configured as UL in the DL HARQ reference configuration by RRC signaling, no HARQ-ACK bit is generated for the serving cell.

If a secondary cell is a TDD cell supporting dynamic UL/DL reconfiguration with traffic adaptation (e.g., an eIMTA cell) and the serving cell is configured with a DL HARQ reference configuration by RRC signaling, and if the reconfiguration signaling is correctly detected, for a subframe that is a DL or special subframe indicated by the reconfiguration DCI format, the UE 102 may monitor the subframe for PDSCH transmission. For a subframe that is a DL or special subframe indicated in the DL HARQ reference configuration by RRC signaling and a UL subframe indicated by the reconfiguration DCI format, the UE 102 may use two NACK bits for a serving cell configured with a downlink transmission mode that support up to two transport blocks, and one NACK bit otherwise.

If the reconfiguration DCI is not correctly detected, there are two approaches that may be utilized. A secondary cell may be a TDD cell supporting dynamic UL/DL reconfiguration with traffic adaptation (e.g., an eIMTA cell) and the cell may be configured with a DL HARQ reference configuration by RRC signaling. In a first approach, if the reconfiguration signaling is not correctly detected, and the subframe is a DL or special subframe defined by the TDD UL/DL configuration of the serving cell in the RRCCommonSCell (e.g., the UL HARQ reference configuration), then the UE 102 may monitor the subframe for PDSCH transmission. For a subframe that is a UL subframe defined by the TDD UL/DL configuration of the serving cell in the RRCCommonSCell (e.g., the UL HARQ reference configuration), and a DL or special subframe is indicated in the DL HARQ reference configuration by RRC signaling, the UE 102 may use two NACK bits for a serving cell configured with a downlink transmission mode that supports up to two transport blocks, and one NACK bit otherwise.

Alternatively, in a second approach, if the reconfiguration signaling is not correctly detected, and the subframe is a DL or special subframe defined by the DL HARQ reference configuration by RRC signaling and there is no UL grant associated with the subframe, then the UE 102 may monitor the subframe for PDSCH transmission.

This procedure may require some minor specification changes and extra UE 102 behavior. However, this procedure reduces the total number of HARQ-ACK bits for the HARQ-ACK reporting on PUCCH and PUSCH. Therefore, it can enhance the HARQ-ACK report performance on PUCCH, and the data transmission performance on PUSCH.

It should be noted that for PUCCH format 3 and PUSCH reporting, the term "FDD as primary cell" includes the case of more than one FDD cells. For PUCCH format 3 and PUSCH reporting, the term "FDD as primary cell" may also include more than one serving cells where the primary cell is a FDD cell and at least one secondary cell is a TDD cell.

For FDD as primary cell with PUCCH format 3, the UE 102 may use PUCCH resource $n_{PUCCH}^{(3,\tilde{p})}$ or $n_{PUCCH}^{(1,\tilde{p})}$ for transmission of HARQ-ACK in subframe n for p̃ mapped to antenna port p. In a first case, for a PDSCH transmission only on the primary cell indicated by the detection of a corresponding PDCCH in subframe n−4, or for a PDCCH indicating downlink SPS release in subframe n−4 on the primary cell, the UE 102 may use PUCCH format 1a/1b and PUCCH resource $n_{PUCCH}^{(1,\tilde{p})}$ with $n_{PUCCH}^{(1,\tilde{p}_0)}=n_{CCE}+N_{PUCCH}^{(1)}$ for antenna port $p_0$. In this case, $n_{CCE}$ is the number of the first CCE (i.e. lowest CCE index used to construct the PDCCH) used for transmission of the corresponding PDCCH and $N_{PUCCH}^{(1)}$ is configured by higher layers. When two antenna port transmission is configured for PUCCH format 1a/1b, the PUCCH resource for antenna port $p_1$ is given by $n_{PUCCH}^{(1,\tilde{p}_1)}=n_{CCE}+1+N_{PUCCH}^{(1)}$.

In a second case, for a PDSCH transmission only on the primary cell where there is not a corresponding PDCCH/EPDCCH detected in subframe n−4, the UE 102 may use PUCCH format 1a/1b and PUCCH resource $n_{PUCCH}^{(1,\tilde{p})}$. The value of $n_{PUCCH}^{(1,\tilde{p})}$ may be determined according to higher layer configuration and Table (5) above. For a UE 102 configured for two antenna port transmission for PUCCH format 1a/1b, a PUCCH resource value in Table (5) maps to two PUCCH resources with the first PUCCH resource $n_{PUCCH}^{(1,\tilde{p}_0)}$ for antenna port $p_0$ and the second PUCCH resource $n_{PUCCH}^{(1,\tilde{p}_1)}$ for antenna port $p_1$, otherwise, the PUCCH resource value maps to a single PUCCH resource $n_{PUCCH}^{(1,\tilde{p}_0)}$ for antenna port $p_0$.

In a third case, for a PDSCH transmission on the secondary cell indicated by the detection of a corresponding PDCCH/EPDCCH in subframe n−4, the UE 102 may use PUCCH format 3 and PUCCH resource $n_{PUCCH}^{(3,\tilde{p})}$ where the value of $n_{PUCCH}^{(3,\tilde{p})}$ is determined according to higher layer configuration and Table (8) (from 3GPP TS 36.213 v11.4.0, Table 10.1.2.2.2-1) below.

TABLE 8

| Value of 'TPC command for PUCCH' or 'HARQ-ACK resource offset' | $n_{PUCCH}^{(3,\tilde{p})}$ |
|---|---|
| '00' | The 1st PUCCH resource value configured by the higher layers |
| '01' | The 2nd PUCCH resource value configured by the higher layers |
| '10' | The 3rd PUCCH resource value configured by the higher layers |
| '11' | The 4th PUCCH resource value configured by the higher layers |

The TPC field in the DCI format of the corresponding PDCCH/EPDCCH may be used to determine the PUCCH resource values from one of the four resource values configured by higher layers, with the mapping defined in Table (8). For a UE 102 configured for two antenna port transmission for PUCCH format 3, a PUCCH resource value in Table (8) maps to two PUCCH resources with the first PUCCH resource $n_{PUCCH}^{(3,\tilde{p}_0)}$ for antenna port $p_0$ and the second PUCCH resource $n_{PUCCH}^{(3,\tilde{p}_1)}$ for antenna port $p_1$, otherwise, the PUCCH resource value maps to a single PUCCH resource $n_{PUCCH}^{(3,\tilde{p}_0)}$ for antenna port $p_0$. A UE 102 may assume that the same HARQ-ACK PUCCH resource value is transmitted in each DCI format of the corresponding secondary cell PDCCH assignments in a given subframe.

In a fourth case, for a PDSCH transmission only on the primary cell indicated by the detection of a corresponding EPDCCH in subframe n−4, or for a EPDCCH indicating downlink SPS release in subframe n−4 on the primary cell, the UE 102 may use PUCCH format 1a/1b and PUCCH resource $n_{PUCCH}^{(1,\tilde{p})}$. If EPDCCH-PRB-set q is configured for distributed transmission, then $n_{PUCCH}^{(1,\tilde{p}_0)}=n_{CCE,q}+\Delta_{ARO}+N_{PUCCH,q}^{(e1)}$. If EPDCCH-PRB-set q is configured for localized transmission, then $$n_{PUCCH}^{(1,\tilde{p}_0)} = \left\lfloor \frac{n_{ECCE,q}}{N_{RB}^{ECCE,q}} \right\rfloor \cdot N_{RB}^{ECCE,q} + n' + \Delta_{ARO} + N_{PUCCH,q}^{(e1)}.$$

For antenna port $p_0$, where $n_{ECCE,q}$ is the number of the first ECCE (e.g., the lowest ECCE index used to construct the EPDCCH) used for transmission of the corresponding DCI assignment in EPDCCH-PRB-set q, $\Delta_{ARO}$ is determined from the HARQ-ACK resource offset field in the DCI format of the corresponding EPDCCH as given in Table (7) above, $N_{PUCCH,q}^{(e1)}$ for EPDCCH-PRB-set q is configured by the higher layer parameter pucch-ResourceStartOffset-r11, and n' is determined from the antenna port used for localized EPDCCH transmission.

A two antenna port transmission may be configured for PUCCH format 1a/1b. If EPDCCH-PRB-set q is configured for distributed transmission, then the PUCCH resource for antenna port $p_1$ is given by $n_{PUCCH}^{(1,\tilde{p}_1)}=n_{ECCE,q}+1+\Delta_{ARO}+N_{PUCCH,q}^{(e1)}$. If EPDCCH-PRB-set q is configured for localized transmission, then the PUCCH resource for antenna port $p_1$ is given by $$n_{PUCCH}^{(1,\tilde{p}_1)} = \left\lfloor \frac{n_{ECCE,q}}{N_{RB}^{ECCE,q}} \right\rfloor \cdot N_{RB}^{ECCE,q} + 1 + n' + \Delta_{ARO} + N_{PUCCH,q}^{(e1)}.$$

Figure 4:
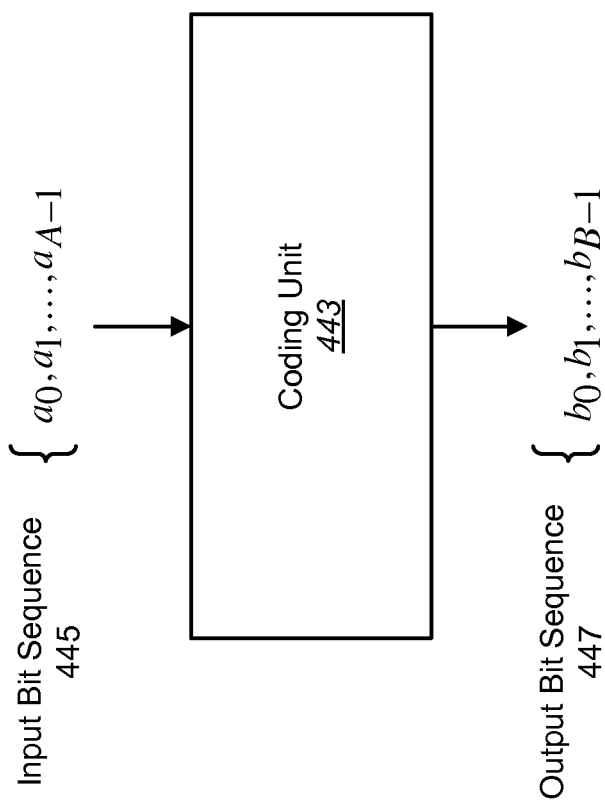
FIG. 4 is a block diagram illustrating one implementation of a coding unit according to the described systems and methods.

FIG. 4 is a block diagram illustrating one implementation of a coding unit 443 according to the described systems and methods. The coding unit 443 may be included in a UE 102. Data may arrive at the coding unit 443 in the form of indicators for measurement indication, scheduling requests and HARQ acknowledgement. The coding unit 443 may receive an input bit sequence 445 (e.g., $a_0, a_1, \ldots, a_{A-1}$). The coding unit 443 may produce an output bit sequence 447 (e.g., $b_0, b_1, \ldots, b_{B-1}$) based on the input bit sequence 445.

Three forms of channel coding may be used. One form of channel coding may be used for HARQ-ACK and for a combination of HARQ-ACK and periodic CSI transmitted on PUCCH format 3, including the cases with scheduling request. Another form of channel coding may be used for the channel quality information (e.g., CQI or Precoding Matrix Indicator (PMI)) transmitted on PUCCH format 2. Yet another form of channel coding may be used for a combination of CQI/PMI and HARQ-ACK transmitted on PUCCH format 2/2a/2b.

The HARQ-ACK bits may be received from higher layers for each subframe of each cell. Each positive acknowledgement (ACK) may be encoded as a binary '1' and each negative acknowledgement (NACK) may be encoded as a binary '0'. For the case where PUCCH format 3 is configured by higher layers and is used for transmission of the HARQ-ACK feedback information, the HARQ-ACK feedback may consist of the concatenation of HARQ-ACK bits for each of the serving cells. For cells configured with transmission modes 1, 2, 5, 6 or 7 (e.g., single codeword transmission modes), 1 bit of HARQ-ACK information ($a_k$) may be used for that cell. For cells configured with other transmission modes, 2 bits of HARQ-ACK information may be used for those cells (e.g., $a_k, a_{k+1}$), with $a_k$ corresponding to HARQ-ACK bit for codeword 0 and $a_{k+1}$ corresponding to that for codeword 1. Therefore, generating one or two NACKs may depend on the number of codewords configured for a subframe of the TDD serving cell.

In one configuration, $O^{ACK}$ may be the number of HARQ-ACK feedback bits. Furthermore, $N_{A/N}^{PUCCH\,format\,3}$ may be the number of HARQ-ACK feedback bits including the possible concurrent transmission of scheduling request and/or periodic CSI when PUCCH format 3 is used for transmission of HARQ-ACK feedback. For FDD as a primary cell, the sequence of bits $\tilde{o}_0^{ACK}, \tilde{o}_1^{ACK}, \ldots, \tilde{o}_{O^{ACK}-1}^{ACK}$ is the result of the concatenation of HARQ-ACK bits for different cells.

In a first approach, the sequence of bits $\tilde{o}_0^{ACK}, \tilde{o}_1^{ACK}, \ldots, \tilde{o}_{O^{ACK}-1}^{ACK}$ may be determined according to Listing (1). In this approach, HARQ-ACK bits may be reported for all subframes and NACK may be generated if no PDSCH is detected in a subframe or the subframe is a UL subframe in a TDD serving cell.

Listing (1)

```
Set c = 0 (cell index: lower indices correspond to lower RRC indices
    of the corresponding cell)
Set j = 0 (HARQ-ACK bit index)
Set N_cells^DL to the number of cells configured by higher layers for the UE
while c < N_cells^DL
    if transmission mode configured in cell c ∈ {1,2,5,6,7} (1 bit
        HARQ-ACK feedback for this cell)
        õ_j^ACK = HARQ-ACK bit of this cell
        j = j + 1
    else
        õ_j^ACK = HARQ-ACK bit corresponding to the first codeword of this
            cell j = j + 1
        õ_j^ACK = HARQ-ACK bit corresponding to the second codeword of
            this cell j = j + 1
    end if
    c = c + 1
end while
```

In a second approach, a HARQ-ACK bit is not reported for a fixed UL subframe in a TDD secondary cell and NACK is generated if no PDSCH is detected in a subframe or the subframe is a UL subframe in a TDD serving cell. In a first alternative of the second approach, the sequence of bits $\tilde{o}_0^{ACK}, \tilde{o}_1^{ACK}, \ldots, \tilde{o}_{O^{ACK}-1}^{ACK}$ may be determined according to Listing (2).

Listing (2)

```
Set c = 0 (cell index: lower indices correspond to lower RRC indices of
    the corresponding cell)
Set j = 0 (HARQ-ACK bit index)
Set N_cells^DL to the number of cells configured by higher layers for the UE
while c < N_cells^DL
    if HARQ-ACK bit of this cell is available
        if transmission mode configured in cell c ∈ {1,2,5,6,7} (1 bit
            HARQ-ACK feedback for this cell)
            õ_j^ACK = HARQ-ACK bit of this cell
            j = j + 1
        else
            õ_j^ACK = HARQ-ACK bit corresponding to the first codeword of
                this cell
            j = j + 1
            õ_j^ACK = HARQ-ACK bit corresponding to the second codeword of
                this cell
            j = j + 1
```

Listing (2) -continued

```
        end if
    end if
    c = c + 1
end while
```

In a second alternative of the second approach, the sequence of bits $\tilde{o}_0^{ACK}, \tilde{o}_1^{ACK}, \ldots, \tilde{o}_{O^{ACK}-1}^{ACK}$ may be determined according to Listing (3).

Listing (3)

```
Set c = 0 (cell index: lower indices correspond to lower RRC indices of
    the corresponding cell)
Set j = 0 (HARQ-ACK bit index)
Set N_cells^DL to the number of cells configured by higher layers for the
UE
while c < N_cells^DL
    if cell c is a FDD cell
        if transmission mode configured in cell c ∈ {1,2,5,6,7} (1 bit
            HARQ-ACK feedback for this cell)
            õ_j^ACK = HARQ-ACK bit of this cell
            j = j + 1
        else
            õ_j^ACK = HARQ-ACK bit corresponding to the first codeword
                of this cell
            j = j + 1
            õ_j^ACK = HARQ-ACK bit corresponding to the second codeword
                of this cell
            j = j + 1
        end if
    end if
    if cell c is a TDD cell with dynamic reconfiguration (e.g., eIMTA
cell)
        and a DL HARQ reference configuration is configured by RRC
        if the subframe is a DL or special subframe in the DL HARQ-ACK
            reference configuration
            if transmission mode configured in cell c ∈ {1,2,5,6,7} (1 bit
                HARQ-ACK feedback for this cell)
                õ_j^ACK = HARQ-ACK bit of this cell
                j = j + 1
            else
                õ_j^ACK = HARQ-ACK bit corresponding to the first codeword
                    of this cell
                j = j + 1
                õ_j^ACK = HARQ-ACK bit corresponding to the second code-
word
                    of this cell
                j = j + 1
            end if
        end if
    end if
    c = c + 1
end while
```

In the case when a transmission of HARQ-ACK feedback using PUCCH format 3 coincides with a sub-frame configured to the UE 102 by higher layers for transmission of scheduling request, the scheduling request bit (e.g., 1=positive SR; 0=negative SR) may be appended at the end of the sequence of concatenated HARQ-ACK bits.

In the case when the transmission of HARQ-ACK feedback using PUCCH format 3 coincides with a sub-frame configured to the UE 102 by higher layers for transmission of periodic CSI, and periodic CSI is not dropped, the periodic CSI bits for the CSI report may be appended at the end of the sequence of concatenated HARQ-ACK bits and scheduling request bit (if any).

As with the transmission of the scheduling request, the procedure above may be used with $N_{A/N}^{PUCCH\,format\,3}$ including the number of periodic CSI bits and scheduling request bit (if any). For $N_{A/N}^{PUCCH\,format\,3} \leq 11$, the bit sequence $a_0, a_1, a_2, \ldots, a_{N_{A/N}^{PUCCH\ format\ 3}-1}$ may be obtained by setting $a_i = \tilde{o}_i^{ACK}$. For $11 < N_{A/N}^{PUCCH\ format\ 3} \leq 22$, the bit sequence $a_0, a_1, a_2, \ldots, a_{N_{A/N}^{PUCCH\ format\ 3}-1}$ may be obtained by setting $a_{i/2} = \tilde{o}_i^{ACK}$ if i is even and if i is odd.

For $N_{A/N}^{PUCCH\ format\ 3} \leq 11$, the sequence of bits $a_0, a_1, a_2, \ldots, a_{N_{A/N}^{PUCCH\ format\ 3}-1}$ may be encoded according to Equation (1).

$$\tilde{b}_i = \sum_{n=0}^{N_{A/N}^{PUCCH\ format\ 3}-1} (a_n \cdot M_{i,n}) \bmod 2 \qquad (1)$$

In Equation (1), i=0, 1, 2, ..., 31 and the basis sequences $M_{i,n}$ are defined in Table (9) (from 3GPP TS 36.212 v11.3.0, Table 5.2.2.6.4-1).

TABLE 9

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 0 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

The output bit sequence $b_0, b_1, b_2, \ldots, b_{B-1}$ may be obtained by circular repetition of the sequence $\tilde{b}_0, \tilde{b}_1, \tilde{b}_2, \ldots, \tilde{b}_{31}$, where $b_i = \tilde{b}_{(i \bmod 32)}$, i=0, 1, 2, ..., B−1 and $B = 4 \cdot N_{sc}^{RB}$. $N_{sc}^{RB}$ is the resource block size in the frequency domain, expressed as a number of subcarriers. In LTE frame structure, $N_{sc}^{RB} = 12$.

For $11 < N_{A/N}^{PUCCH\ format\ 3} \leq 22$, the sequences of bits $a_0, a_1, a_2, \ldots, a_{\lceil N_{A/N}^{PUCCH\ format\ 3}/2 \rceil - 1}$ and $a_{\lceil N_{A/N}^{PUCCH\ format\ 3}/2 \rceil}$, $a_{\lceil N_{A/N}^{PUCCH\ format\ 3}/2 \rceil + 1}, a_{\lceil N_{A/N}^{PUCCH\ format\ 3}/2 \rceil + 2}, \ldots a_{N_{A/N}^{PUCCH\ format\ 3}-1}$ may be encoded according to Equations (2) and (3).

$$\tilde{b}_i = \sum_{n=0}^{\lceil N_{A/N}^{PUCCH\ format\ 3}/2 \rceil - 1} (a_n \cdot M_{i,n}) \bmod 2 \qquad (2)$$

$$\tilde{\tilde{b}}_i = \sum_{n=0}^{X} \left( a_{\lceil N_{A/N}^{PUCCH\ format\ 3}/2 \rceil + n} \cdot M_{i,n} \right) \bmod 2 \qquad (3)$$

In Equations (2) and (3), i=0, 1, 2, ..., 23 and the basis sequences $M_{i,n}$ are defined in Table (9) above. In Equation (3), $X = N_{A/N}^{PUCCH\ format\ 3} - \lfloor N_{A/N}^{PUCCH\ format\ 3}/2 \rfloor - 1$.

The output bit sequence $b_0, b_1, b_2, \ldots, b_{B-1}$ where $B = 4 \cdot N_{sc}^{RB}$ may be obtained by an alternate concatenation of the bit sequences $\tilde{b}_0, \tilde{b}_1, \tilde{b}_2, \ldots, \tilde{b}_{23}$ and $\tilde{\tilde{b}}_0, \tilde{\tilde{b}}_1, \tilde{\tilde{b}}_2, \ldots, \tilde{\tilde{b}}_{23}$ according to Listing (4).

Listing (4)

Set i, j = 0
while i < 4 · $N_{sc}^{RB}$
   $b_i = \tilde{b}_j$, $b_{i+1} = \tilde{b}_{j+1}$
   $b_{i+2} = \tilde{\tilde{b}}_j$, $b_{i+3} = \tilde{\tilde{b}}_{j+1}$
   i = i + 4
   j = j + 2
end while When PUCCH format 3 is not used for transmission of HARQ-ACK feedback, the HARQ-ACK bits may be processed for transmission.

Control data may arrive at the coding unit 443 in the form of channel quality information (CQI and/or PMI), HARQ-ACK and rank indication. Different coding rates for the control information may be achieved by allocating different numbers of coded symbols for the control information transmission. When control data are transmitted in the PUSCH, the channel coding for HARQ-ACK, rank indication and channel quality information $o_0, o_1, o_2, \ldots, o_{O-1}$ may be performed independently.

For FDD or TDD HARQ-ACK multiplexing when HARQ-ACK consists of one or two bits of information, the bit sequence $q_0^{ACK}, q_1^{ACK}, q_2^{ACK}, \ldots, q_{q_{ACK}-1}^{ACK}$ may be obtained by concatenation of multiple encoded HARQ-ACK blocks where $Q_{ACK}$ is the total number of coded bits for all the encoded HARQ-ACK blocks. The last concatenation of the encoded HARQ-ACK block may be partial so that the total bit sequence length is equal to $Q_{ACK}$.

For FDD as a primary cell, when HARQ-ACK includes 2 or more bits of information as a result of the aggregation of more than one DL cell, the bit sequence $o_0^{ACK}, o_1^{ACK}, \ldots, o_{O^{ACK}-1}^{ACK}$ is the result of the concatenation of HARQ-ACK bits for the multiple DL cells. This may be accomplished according to Listing (5).

Listing (5)

Figure 5:
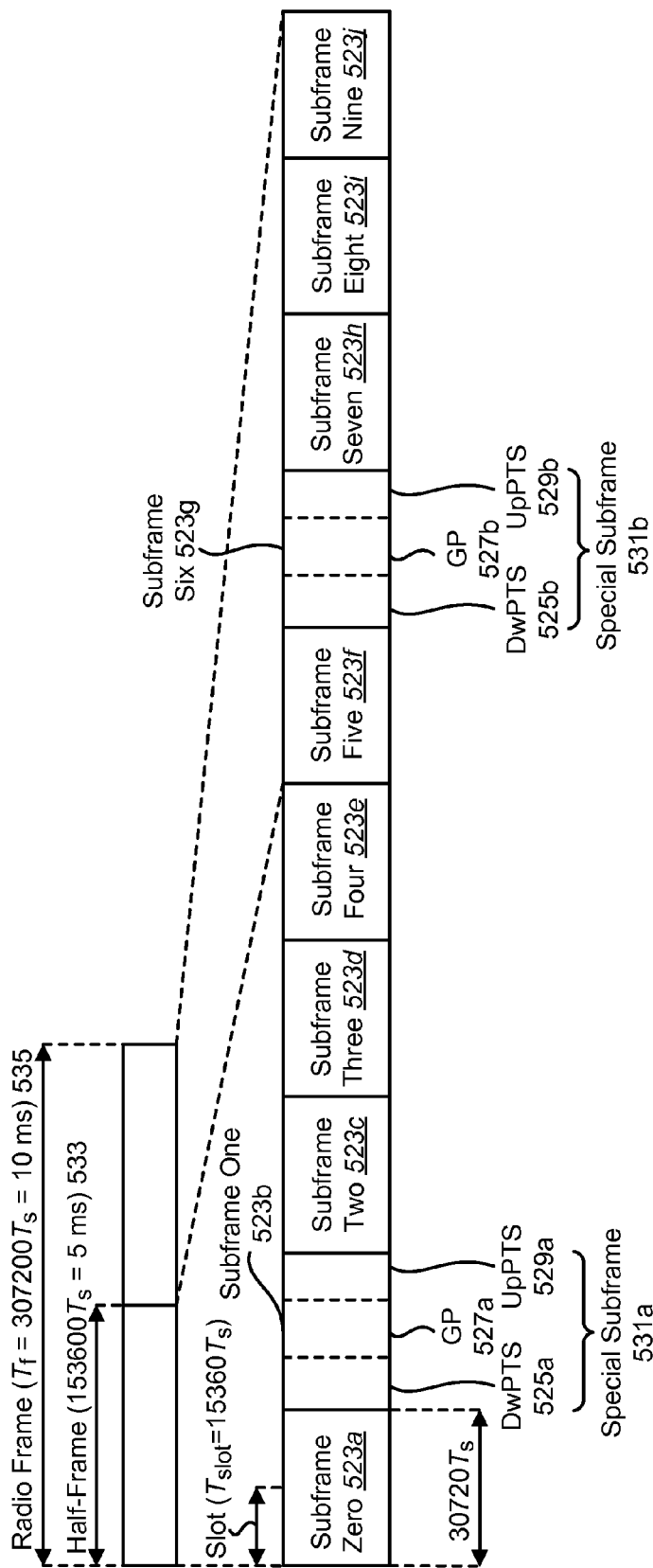
FIG. 5 is a diagram illustrating one example of a radio frame that may be used in accordance with the systems and methods disclosed herein.

Set c = 0 (cell index: lower indices correspond to lower RRC indices
    of corresponding cell)
Set j = 0 (HARQ-ACK bit index)
Set $N_{cells}^{DL}$ to the number of cells configured by higher layers for the UE
while c < $N_{cells}^{DL}$
    if HARQ-ACK bit of this cell is available
        if transmission mode configured in cell c∈ {1,2,5,6,7} (1 bit
            HARQ-ACK feedback for this cell)
            $õ_j^{ACK}$ = HARQ-ACK bit of this cell
            j = j + 1
        else
            $õ_j^{ACK}$ = HARQ-ACK bit corresponding to the first codeword of
                this cell
            j = j + 1
            $õ_j^{ACK}$ = HARQ-ACK bit corresponding to the second codeword
                of this cell
            j = j + 1
        end if
    end if
    c = c + 1
end while FIG. 5 is a diagram illustrating one example of a radio frame 535 that may be used in accordance with the systems and methods disclosed herein. This radio frame 535 structure illustrates a TDD structure. Each radio frame 535 may have a length of $T_f = 307200 \cdot T_s = 10$ ms, where $T_f$ is a radio frame 535 duration and $T_s$ is a time unit equal to $$\frac{1}{(15000 \times 2048)}$$

seconds. The radio frame 535 may include two half-frames 533, each having a length of $153600 \cdot T_s = 5$ ms. Each half-frame 533 may include five subframes 523a-e, 523f-j each having a length of $30720 \cdot T_s = 1$ ms.

TDD UL/DL configurations 0-6 are given below in Table (10) (from Table 4.2-2 in 3GPP TS 36.211). UL/DL configurations with both 5 millisecond (ms) and 10 ms downlink-to-uplink switch-point periodicity may be supported. In particular, seven UL/DL configurations are specified in 3GPP specifications, as shown in Table (10) below. In Table (10), "D" denotes a downlink subframe, "S" denotes a special subframe and "U" denotes a UL subframe.

TABLE 10

| TDD UL/DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table (10) above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table (11) (from Table 4.2-1 of 3GPP TS 36.211) subject to the total length of DwPTS, GP and UpPTS being equal to $30720 \cdot T_s = 1$ ms. In Table (11), "cyclic prefix" is abbreviated as "CP" and "configuration" is abbreviated as "Config" for convenience.

TABLE 11

| | Normal CP in downlink | | | Extended CP in downlink | | |
|---|---|---|---|---|---|---|
| | | UpPTS | | | UpPTS | |
| Special Subframe Config | DwPTS | Normal CP in uplink | Extended CP in uplink | DwPTS | Normal CP in uplink | Extended CP in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | | | |
| 8 | 24144 · $T_s$ | | | | | |

UL/DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 523 that may be used include a downlink subframe, an uplink subframe and a special subframe 531. In the example illustrated in FIG. 5, which has a 5 ms periodicity, two standard special subframes 531a-b are included in the radio frame 535.

The first special subframe 531a includes a downlink pilot time slot (DwPTS) 525a, a guard period (GP) 527a and an uplink pilot time slot (UpPTS) 529a. In this example, the first standard special subframe 531a is included in subframe one 523b. The second standard special subframe 531b includes a downlink pilot time slot (DwPTS) 525b, a guard period (GP) 527b and an uplink pilot time slot (UpPTS) 529b. In this example, the second standard special subframe 531b is included in subframe six 523g. The length of the DwPTS 525a-b and UpPTS 529a-b may be given by Table 4.2-1 of 3GPP TS 36.211 (illustrated in Table (11) above) subject to the total length of each set of DwPTS 525, GP 527 and UpPTS 529 being equal to $30720 \cdot T_s = 1$ ms.

Each subframe i 523a-j (where i denotes a subframe ranging from subframe zero 523a (e.g., 0) to subframe nine 523j (e.g., 9) in this example) is defined as two slots, 2i and 2i+1 of length $T_{slot} = 15360 \cdot T_s = 0.5$ ms in each subframe 523. For example, subframe zero (e.g., 0) 523a may include two slots, including a first slot.

UL/DL configurations with both 5 ms and 10 ms downlink-to-uplink switch-point periodicity may be used in accordance with the systems and methods disclosed herein. FIG. 5 illustrates one example of a radio frame 535 with 5 ms switch-point periodicity. In the case of 5 ms downlink-to-uplink switch-point periodicity, each half-frame 533 includes a standard special subframe 531a-b. In the case of 10 ms downlink-to-uplink switch-point periodicity, a special subframe 531 may exist in the first half-frame 533 only.

Subframe zero (e.g., 0) 523a and subframe five (e.g., 5) 523f and DwPTS 525a-b may be reserved for downlink transmission. The UpPTS 529a-b and the subframe(s) immediately following the special subframe(s) 531a-b (e.g., subframe two 523c and subframe seven 523h) may be reserved for uplink transmission. It should be noted that, in some implementations, special subframes 531 may be considered DL subframes in order to determine a set of DL subframe associations that indicate UCI transmission uplink subframes of a UCI transmission cell.

Figure 6:
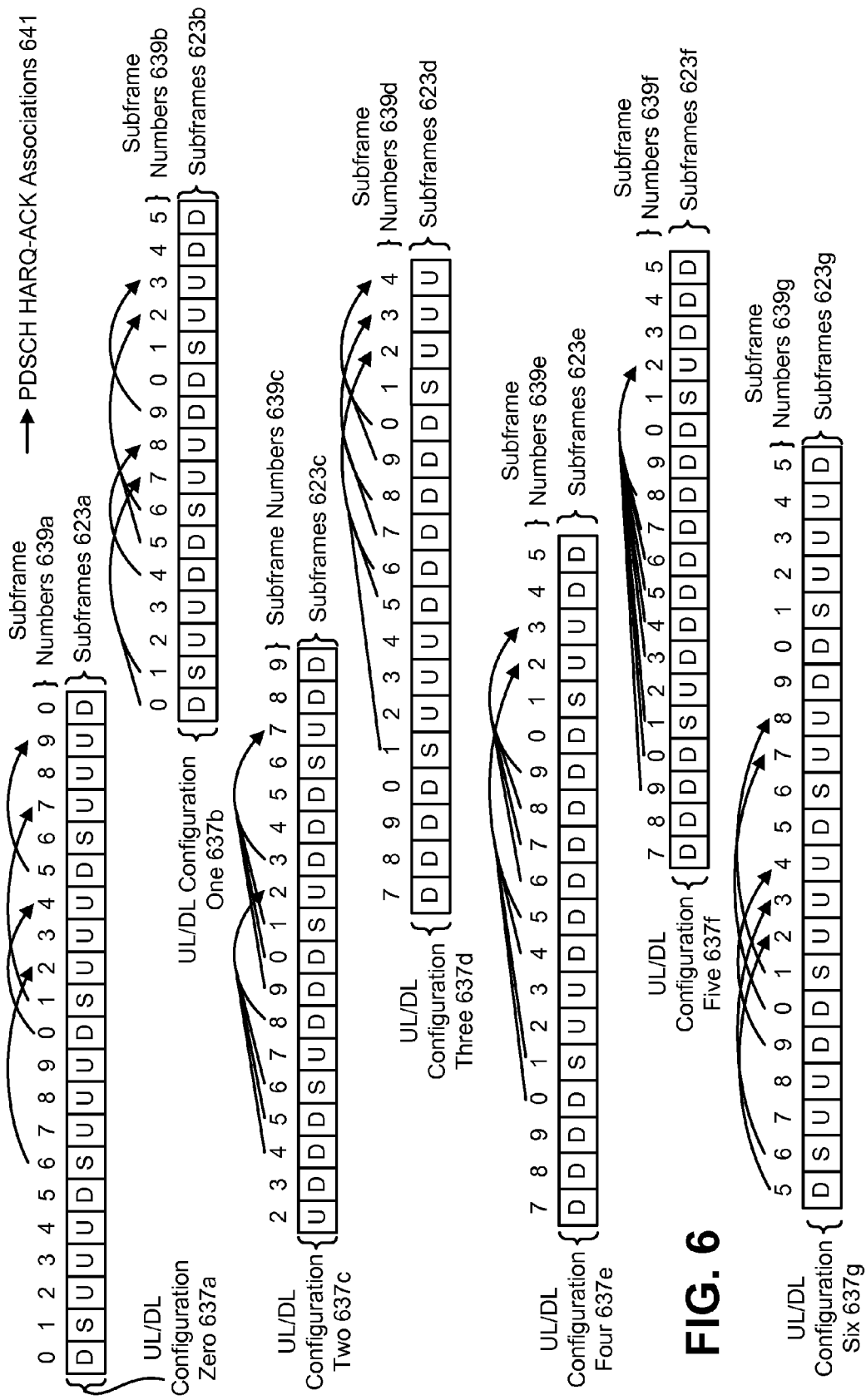
FIG. 6 is a diagram illustrating some Time-Division Duplexing (TDD) uplink-downlink (UL/DL) configurations in accordance with the systems and methods described herein.

FIG. 6 is a diagram illustrating some TDD UL/DL configurations 637a-g in accordance with the systems and methods described herein. There are seven different TDD UL/DL configurations, all with different association timings. In particular, FIG. 6 illustrates UL/DL configuration zero 637a (e.g., "UL/DL configuration 0") with subframes 623a and subframe numbers 639a, UL/DL configuration one 637b (e.g., "UL/DL configuration 1") with subframes 623b and subframe numbers 639b, UL/DL configuration two 637c (e.g., "UL/DL configuration 2") with subframes 623c and subframe numbers 639c and UL/DL configuration three 637d (e.g., "UL/DL configuration 3") with subframes 623d and subframe numbers 639d. FIG. 6 also illustrates UL/DL configuration four 637e (e.g., "UL/DL configuration 4") with subframes 623e and subframe numbers 639e, UL/DL configuration five 637f (e.g., "UL/DL configuration 5") with subframes 623f and subframe numbers 639f and UL/DL configuration six 637g (e.g., "UL/DL configuration 6") with subframes 623g and subframe numbers 639g.

FIG. 6 further illustrates PDSCH HARQ-ACK associations 641 (e.g., PDSCH HARQ-ACK feedback on PUCCH or PUSCH associations). The PDSCH HARQ-ACK associations 641 may indicate HARQ-ACK reporting subframes corresponding to subframes for PDSCH transmissions (e.g., subframes in which PDSCH transmissions may be sent and/or received). It should be noted that some of the radio frames illustrated in FIG. 6 have been truncated for convenience.

Figure 7:
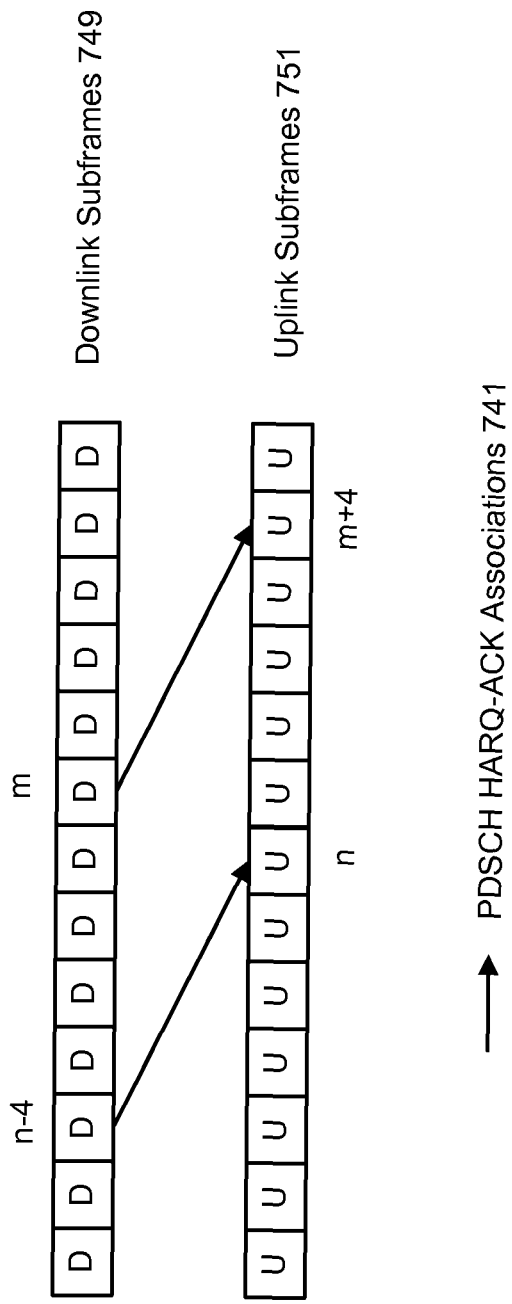
FIG. 7 illustrates the association timings of a Frequency Division Duplexing (FDD) cell.

FIG. 7 illustrates the association timings of a FDD cell. The FDD cell may include paired downlink subframes 749 and uplink subframes 751. The PDSCH HARQ-ACK associations 741 for an FDD cell are illustrated. The PDSCH HARQ-ACK associations 741 may indicate HARQ-ACK reporting subframes corresponding to subframes for PDSCH transmissions (e.g., subframes in which PDSCH transmissions may be sent and/or received). In some implementations, the PDSCH HARQ-ACK reporting may occur on a PUCCH or a PUSCH.

A fixed 4 ms interval may be applied to the PDSCH HARQ-ACK associations 741. In one implementation, each of the downlink subframes 749 and uplink subframes 751 may be 1 ms. Therefore, the PDSCH HARQ-ACK transmission in subframe m+4 may be associated with a PDSCH transmission in subframe m. Similarly, a PDSCH transmission in subframe n−4 may be associated with the PDSCH HARQ-ACK transmission in subframe n.

Figure 8:
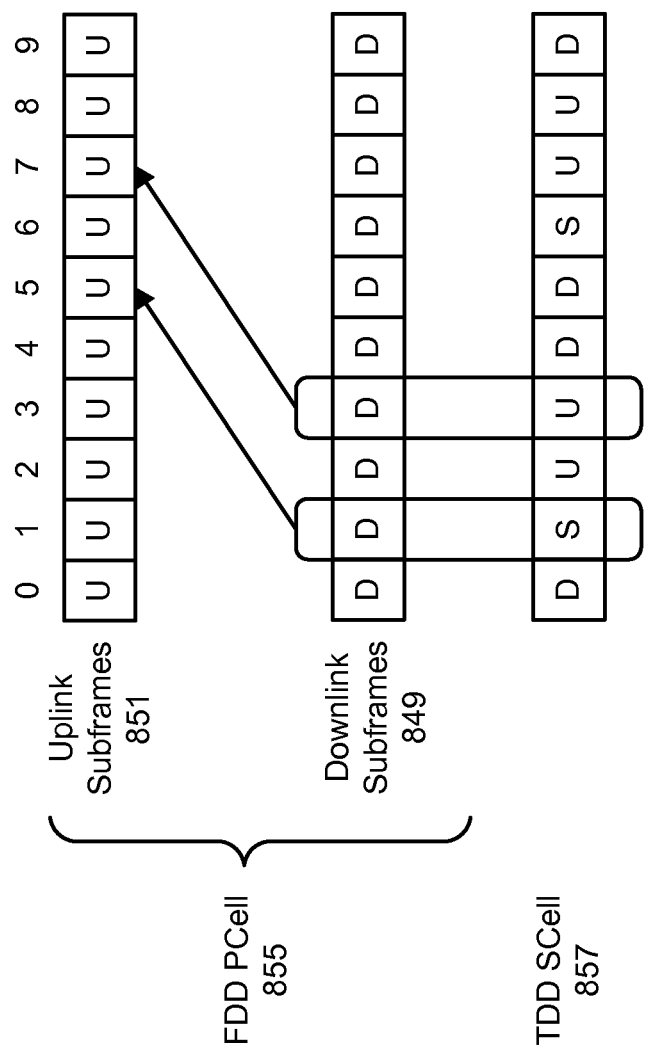
FIG. 8 illustrates the association timings of a FDD primary cell (PCell) and a TDD secondary cell (SCell)

FIG. 8 illustrates the association timings of a FDD PCell 855 and a TDD SCell 857. In this example, the FDD PCell 855 and the TDD SCell 857 may be configured for TDD-FDD CA with the FDD cell 855 as the PCell.

For the FDD PCell 855, each of the downlink subframes 849 and uplink subframes 851 may be 1 ms, as described above in connection with FIG. 7. The TDD SCell 857 may be configured with an UL/DL configuration 637, as described above in connection with FIG. 6. In this case, the TDD SCell 857 is configured with UL/DL configuration one 637b. However, other UL/DL configurations 637 may be used.

In this example, the HARQ-ACK for a PDSCH transmission in subframe 1 may be reported in subframe 5. Because both the FDD PCell 855 and the TDD SCell 857 are DL or special subframe, the FDD CA procedures can be reused.

For subframe 3, the HARQ-ACK for a PDSCH transmission typically would be reported in subframe 7. However, because the TDD SCell 857 is a UL subframe, the FDD CA procedures may not be reused. Instead, HARQ-ACK reporting may be accomplished as described above in connection with FIG. 2 and FIG. 3.

Figure 9:
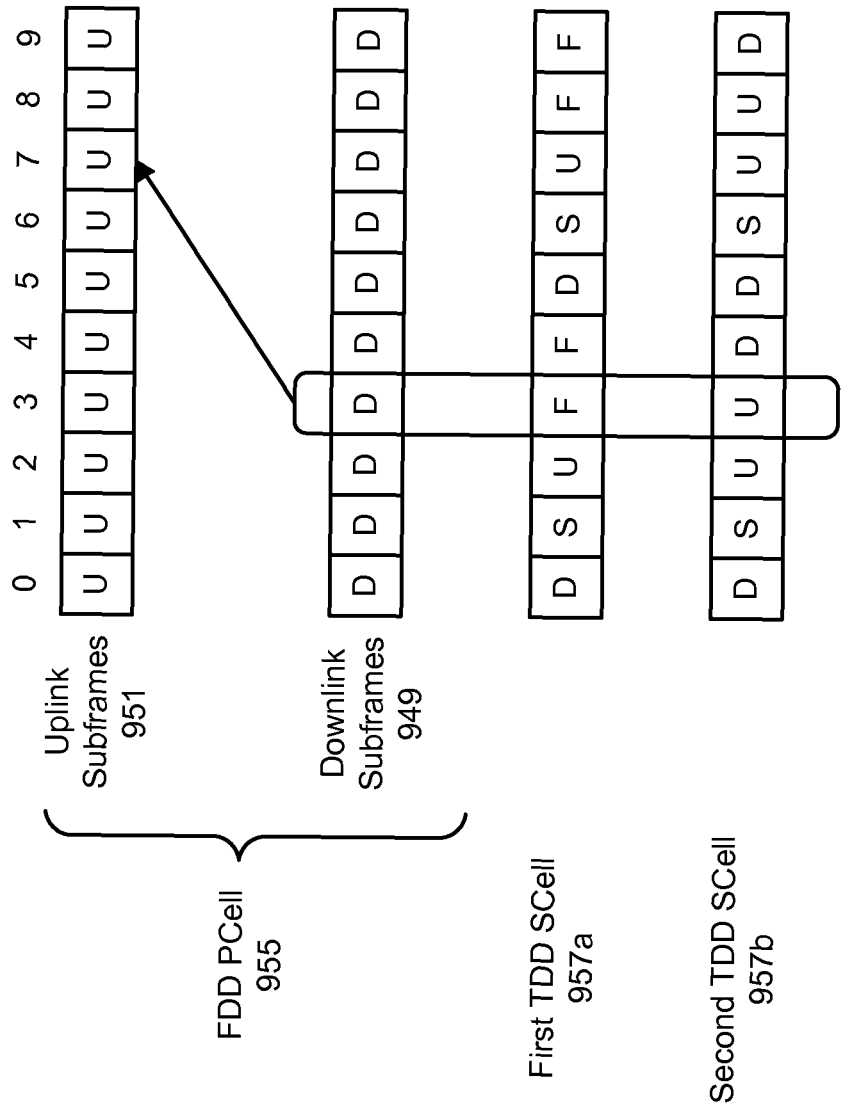
FIG. 9 illustrates the association timings of a FDD PCell, a first TDD SCell and a second TDD SCell.

FIG. 9 illustrates the association timings of a FDD PCell 955, a first TDD SCell 957a and a second TDD SCell 957b. In this example, the FDD PCell 955, the first TDD SCell 957a and the second TDD SCell 957b may be configured for TDD-FDD CA with the FDD cell 955 as the PCell.

For the FDD PCell 955, each of the downlink subframes 949 and uplink subframes 951 may be 1 ms, as described above in connection with FIG. 7. The second TDD SCell 957b may be configured with an UL/DL configuration 637, as described above in connection with FIG. 6. In this case, the second TDD SCell 957*b* is configured with UL/DL configuration one 637*b*. However, other UL/DL configurations 637 may be used.

The first TDD SCell 957*a* may be configured with dynamic UL/DL reconfiguration. In other words, the first TDD SCell 957*a* may be an eIMTA cell.

In this example, the HARQ-ACK for a PDSCH transmission in subframe 3 typically would be reported in subframe 7. However, in this case, the subframe of the first TDD SCell 957*a* is a flexible subframe and the subframe of the second TDD SCell 957*b* is a UL subframe. Therefore, the FDD CA procedures may not be reused. Instead, HARQ-ACK reporting may be accomplished as described above in connection with FIG. 2 and FIG. 3.

Figure 10:
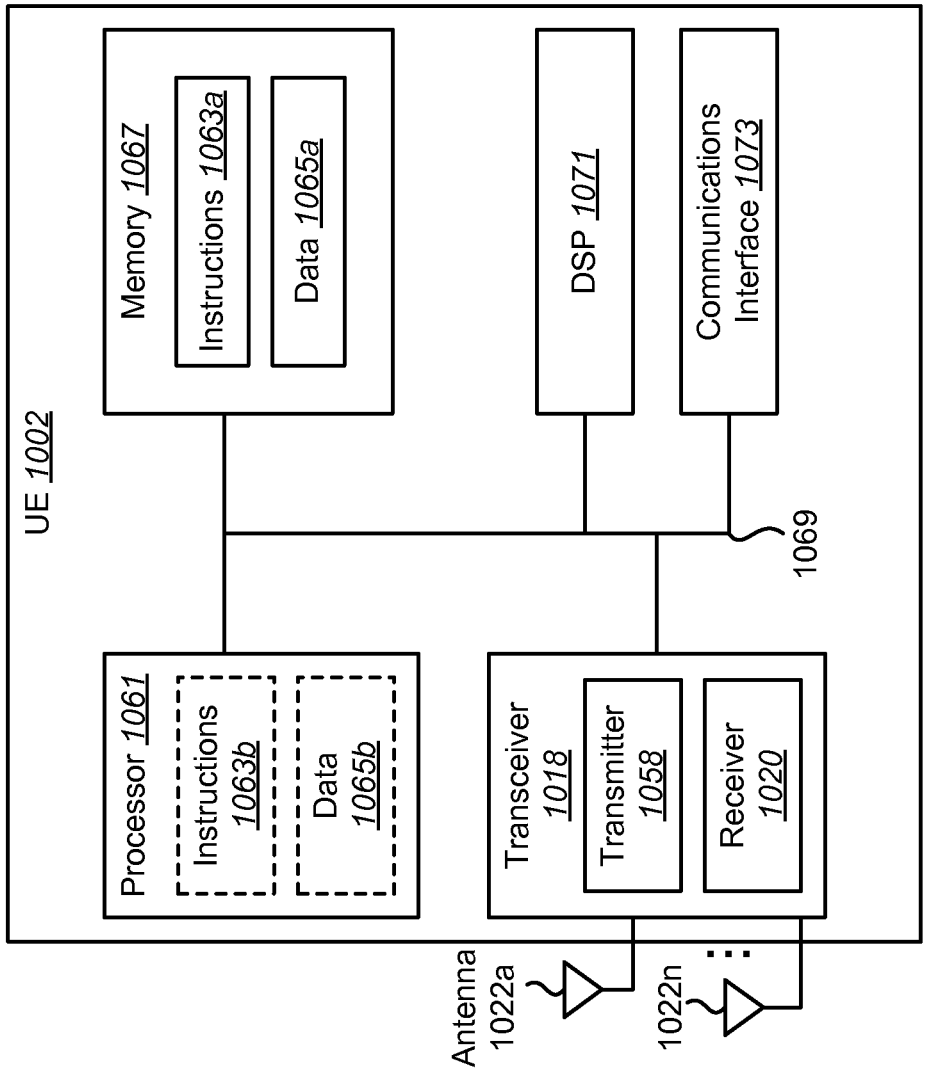
FIG. 10 illustrates various components that may be utilized in a UE.

FIG. 10 illustrates various components that may be utilized in a UE 1002. The UE 1002 described in connection with FIG. 10 may be implemented in accordance with the UE 102 described in connection with FIG. 1. The UE 1002 includes a processor 1061 that controls operation of the UE 1002. The processor 1061 may also be referred to as a central processing unit (CPU). Memory 1067, which may include read-only memory (ROM), random access memory (RAM), a combination of the two or any type of device that may store information, provides instructions 1063*a* and data 1065*a* to the processor 1061. A portion of the memory 1067 may also include non-volatile random access memory (NVRAM). Instructions 1063*b* and data 1065*b* may also reside in the processor 1061. Instructions 1063*b* and/or data 1065*b* loaded into the processor 1061 may also include instructions 1063*a* and/or data 1065*a* from memory 1067 that were loaded for execution or processing by the processor 1061. The instructions 1063*b* may be executed by the processor 1061 to implement one or more of the methods 200 and 300 described above.

The UE 1002 may also include a housing that contains one or more transmitters 1058 and one or more receivers 1020 to allow transmission and reception of data. The transmitter(s) 1058 and receiver(s) 1020 may be combined into one or more transceivers 1018. One or more antennas 1022*a-n* are attached to the housing and electrically coupled to the transceiver 1018.

The various components of the UE 1002 are coupled together by a bus system 1069, which may include a power bus, a control signal bus and a status signal bus, in addition to a data bus. However, for the sake of clarity, the various buses are illustrated in FIG. 10 as the bus system 1069. The UE 1002 may also include a digital signal processor (DSP) 1071 for use in processing signals. The UE 1002 may also include a communications interface 1073 that provides user access to the functions of the UE 1002. The UE 1002 illustrated in FIG. 10 is a functional block diagram rather than a listing of specific components.

Figure 11:
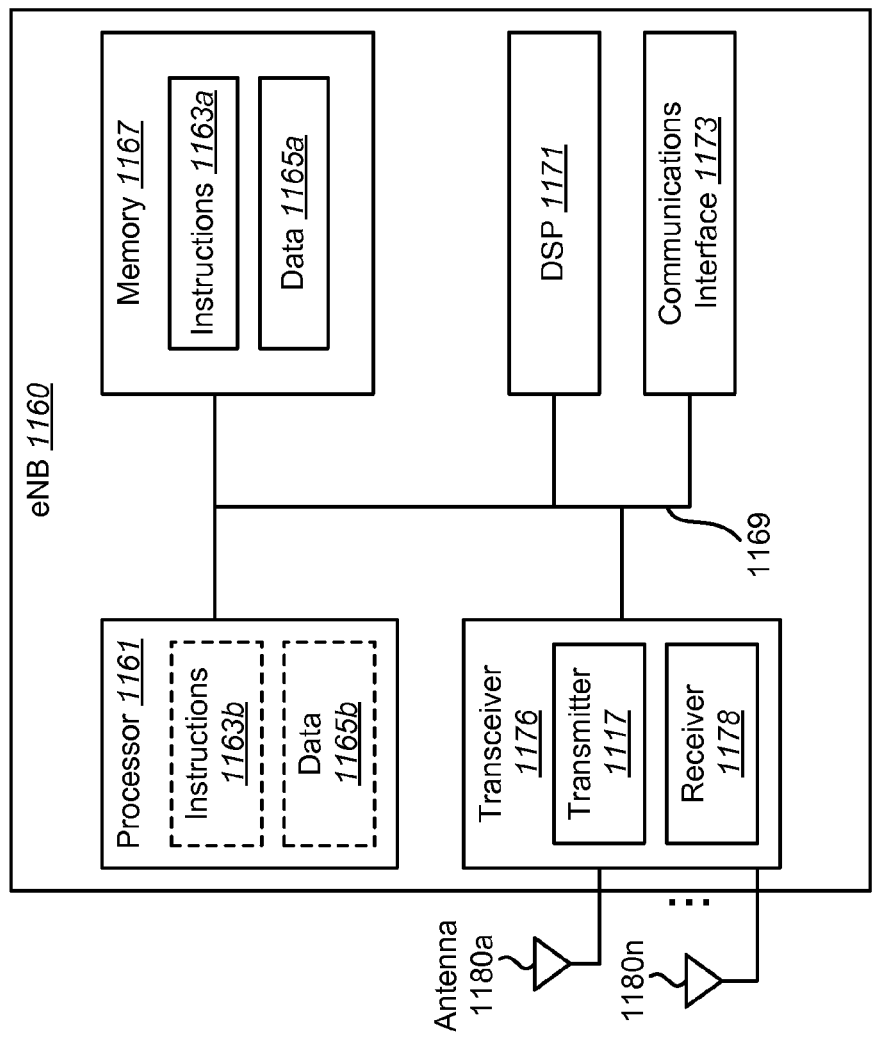
FIG. 11 illustrates various components that may be utilized in an eNB.

FIG. 11 illustrates various components that may be utilized in an eNB 1160. The eNB 1160 described in connection with FIG. 11 may be implemented in accordance with the eNB 160 described in connection with FIG. 1. The eNB 1160 includes a processor 1161 that controls operation of the eNB 1160. The processor 1161 may also be referred to as a central processing unit (CPU). Memory 1167, which may include read-only memory (ROM), random access memory (RAM), a combination of the two or any type of device that may store information, provides instructions 1163*a* and data 1165*a* to the processor 1161. A portion of the memory 1167 may also include non-volatile random access memory (NVRAM). Instructions 1163*b* and data 1165*b* may also reside in the processor 1161. Instructions 1163*b* and/or data 1165*b* loaded into the processor 1161 may also include instructions 1163*a* and/or data 1165*a* from memory 1167 that were loaded for execution or processing by the processor 1161.

The eNB 1160 may also include a housing that contains one or more transmitters 1117 and one or more receivers 1178 to allow transmission and reception of data. The transmitter(s) 1117 and receiver(s) 1178 may be combined into one or more transceivers 1176. One or more antennas 1180*a-n* are attached to the housing and electrically coupled to the transceiver 1176.

The various components of the eNB 1160 are coupled together by a bus system 1169, which may include a power bus, a control signal bus and a status signal bus, in addition to a data bus. However, for the sake of clarity, the various buses are illustrated in FIG. 11 as the bus system 1169. The eNB 1160 may also include a digital signal processor (DSP) 1171 for use in processing signals. The eNB 1160 may also include a communications interface 1173 that provides user access to the functions of the eNB 1160. The eNB 1160 illustrated in FIG. 11 is a functional block diagram rather than a listing of specific components.

Figure 12:
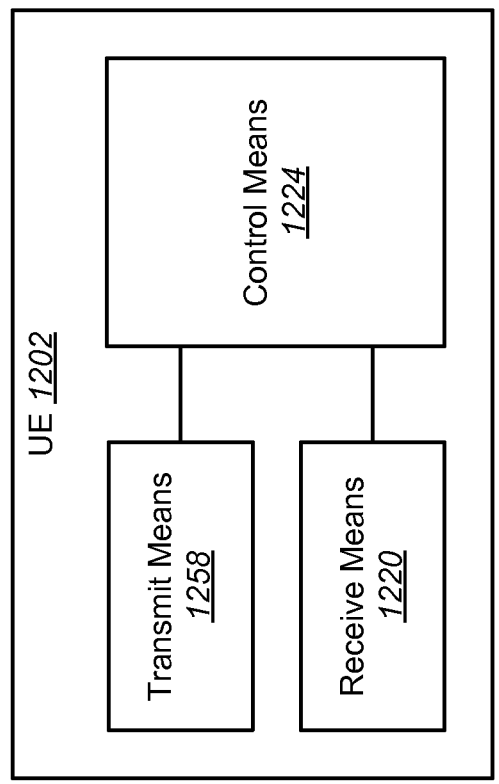
FIG. 12 is a block diagram illustrating one configuration of a UE in which systems and methods for performing carrier aggregation may be implemented.

FIG. 12 is a block diagram illustrating one implementation of a UE 1202 in which systems and methods for performing carrier aggregation may be implemented. The UE 1202 includes transmit means 1258, receive means 1220 and control means 1224. The transmit means 1258, receive means 1220 and control means 1224 may be configured to perform one or more of the functions described in connection with FIG. 2, FIG. 3 and FIG. 10 above. FIG. 10 above illustrates one example of a concrete apparatus structure of FIG. 12. Other various structures may be implemented to realize one or more of the functions of FIG. 2, FIG. 3 and FIG. 10. For example, a DSP may be realized by software.

Figure 13:
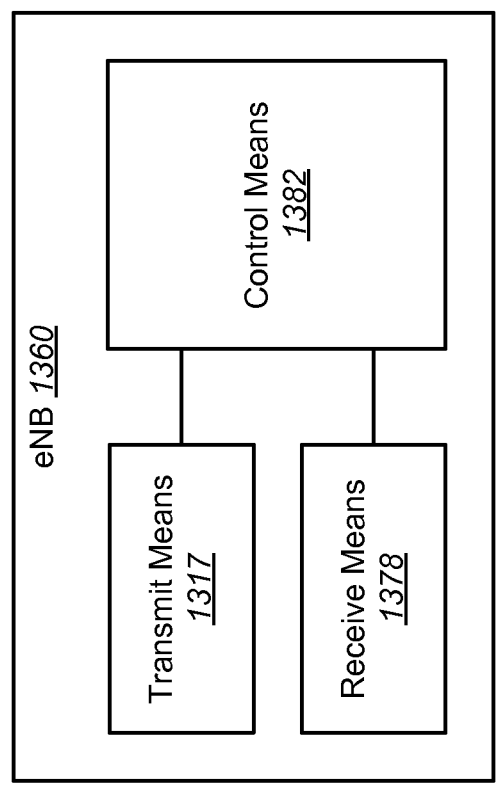
FIG. 13 is a block diagram illustrating one configuration of an eNB in which systems and methods for performing carrier aggregation may be implemented.

FIG. 13 is a block diagram illustrating one implementation of an eNB 1360 in which systems and methods for performing carrier aggregation may be implemented. The eNB 1360 includes transmit means 1317, receive means 1378 and control means 1382. The transmit means 1317, receive means 1378 and control means 1382 may be configured to perform one or more of the functions described above. FIG. 13 above illustrates one example of a concrete apparatus structure of FIG. 11. Other various structures may be implemented to realize one or more of the functions of FIG. 11. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A user equipment (UE) for performing carrier aggregation, comprising:
    a processor;
    memory in electronic communication with the processor, wherein instructions stored in the memory are executable to:
        determine a duplex method of each serving cell for carrier aggregation, wherein a primary cell is a frequency-division duplexing (FDD) cell and a secondary cell is a time-division duplexing (TDD) cell; and
        for transmitting hybrid automatic repeat request acknowledgement/negative acknowledgement (HARQ-ACK) information using a physical uplink control channel (PUCCH) format 1b with channel selection in a first subframe:
            determine whether to use a PUCCH format 1b procedure for a single FDD serving cell or a PUCCH format 1b with channel selection procedure for multiple FDD serving cells based on whether a second subframe, which is a subframe four subframes before the first subframe, is an uplink subframe for the secondary cell; and
            use the PUCCH format 1b procedure for the single FDD serving cell, in a case that the second subframe is the uplink subframe for the secondary cell.

2. The UE of claim 1, further comprising instructions executable to determine whether the second subframe is an uplink subframe for the secondary cell based on an uplink/downlink (UL/DL) configuration defined by a radio resource control common secondary cell (RRCCommonSCell) message.

3. The UE of claim 1, wherein when the second subframe is an uplink subframe for the secondary cell, no HARQ-ACK bit for the second subframe is generated for the secondary cell.

4. An evolved Node B (eNB) for performing carrier aggregation, comprising:
    a processor;
    memory in electronic communication with the processor, wherein instructions stored in the memory are executable to:
        determine a duplex method of each serving cell for carrier aggregation, wherein a primary cell is a frequency-division duplexing (FDD) cell and a secondary cell is a time-division duplexing (TDD) cell; and
        for receiving hybrid automatic repeat request acknowledgement/negative acknowledgement (HARQ-ACK) information using a physical uplink control channel (PUCCH) format 1b with channel selection in a first subframe:
            determine whether to use a PUCCH format 1b procedure for a single FDD serving cell or a PUCCH format 1b with channel selection procedure for multiple FDD serving cells based on whether a second subframe, which is a subframe four subframes before the first subframe, is an uplink subframe for the secondary cell; and
            use the PUCCH format 1b procedure for the single FDD serving cell, in a case that the second subframe is the uplink subframe for the secondary cell.

5. The eNB of claim 4, wherein determining whether the second subframe is an uplink subframe for the secondary cell is based on an uplink/downlink (UL/DL) configuration defined by a radio resource control common secondary cell (RRCCommonSCell) message.

6. The eNB of claim 4, wherein when the second subframe is an uplink subframe for the secondary cell, no HARQ-ACK bit for the second subframe is generated for the secondary cell.

7. A method for performing carrier aggregation by a user equipment (UE), comprising:
    determining a duplex method of each serving cell for carrier aggregation, wherein a primary cell is a frequency-division duplexing (FDD) cell and a secondary cell is a time-division duplexing (TDD) cell; and
    for transmitting hybrid automatic repeat request acknowledgement/negative acknowledgement (HARQ-ACK) information using a physical uplink control channel (PUCCH) format 1b with channel selection in a first subframe:
        determining whether to use a PUCCH format 1b procedure for a single FDD serving cell or a PUCCH format 1b with channel selection procedure for multiple FDD serving cells based on whether a second subframe, which is a subframe four subframes before the first subframe, is an uplink subframe for the secondary cell; and
        using the PUCCH format 1b procedure for the single FDD serving cell, in a case that the second subframe is the uplink subframe for the secondary cell.

8. The method of claim 7, further comprising determining whether the second subframe is an uplink subframe for the secondary-cell based on an uplink/downlink (UL/DL) configuration defined by a radio resource control common secondary cell (RRCCommonSCell) message.

9. The method of claim 7,
    wherein when the second subframe is an uplink subframe for the secondary cell, no HARQ-ACK bit for the second subframe is generated secondary cell.

10. A method for performing carrier aggregation by an evolved Node B (eNB), comprising:
    determining a duplex method of each serving cell for carrier aggregation, wherein a primary cell is a frequency-division duplexing (FDD) cell and a secondary cell is a time-division duplexing (TDD) cell; and
    for receiving hybrid automatic repeat request acknowledgement/negative acknowledgement (HARQ-ACK) information using a physical uplink control channel (PUCCH) format 1b with channel selection in a first subframe:
        determining whether to use a PUCCH format 1b procedure for a single FDD serving cell or a PUCCH format 1b with channel selection procedure for multiple FDD serving cells based on whether a second subframe, which is a subframe four subframes before the first subframe, is an uplink subframe for the secondary cell; and using the PUCCH format 1b procedure for the single FDD serving cell, in a case that the second subframe is the uplink subframe for the secondary cell.

11. The method of claim 10, wherein determining whether the second subframe is an uplink subframe for the secondary cell is based on an uplink/downlink (UL/DL) configuration defined by a radio resource control common secondary cell (RRCCommonSCell) message.

12. The method of claim 10, wherein when the second subframe is an uplink subframe for the secondary cell, no HARQ-ACK bit for the second subframe is generated for the secondary cell.

* * * * *